US012670336B2

(12) United States Patent
McNamara et al.

(10) Patent No.: US 12,670,336 B2
(45) Date of Patent: Jun. 30, 2026

(54) METHODS, SYSTEMS, APPARATUSES, AND DEVICES FOR FACILITATING CUSTOMIZABLE COMMUNICATIONS WITH USERS

(71) Applicant: Neoptio Health Incorporated, Vancouver (CA)

(72) Inventors: Christopher David McNamara, Nelson (CA); Larry John Skelly, Whitby (CA); Mark Edward Russel Giroux, Winnipeg (CA); Mark Daniel Szynkaruk, Grand Forks (CA)

(73) Assignee: Neoptio Health Incorporated (CA)

( * ) Notice: Subject to any disclaimer, the term of this patent is extended or adjusted under 35 U.S.C. 154(b) by 0 days.

(21) Appl. No.: 19/196,797

(22) Filed: May 2, 2025

(65) Prior Publication Data
US 2025/0259007 A1 Aug. 14, 2025

Related U.S. Application Data

(63) Continuation of application No. PCT/IB2024/056514, filed on Jul. 3, 2024.

(60) Provisional application No. 63/525,020, filed on Jul. 5, 2023.

(51) Int. Cl.
*G06F 40/35* (2020.01)
*G06F 3/01* (2006.01)

(52) U.S. Cl.
CPC .............. *G06F 40/35* (2020.01); *G06F 3/011* (2013.01); *G06F 2203/011* (2013.01)

(58) Field of Classification Search
USPC ............................................... 704/7–10, 257
See application file for complete search history.

(56) References Cited

U.S. PATENT DOCUMENTS

| | | | |
|---|---|---|---|
| 9,460,713 | B1 * | 10/2016 | Moreno Mengibar ...................... G10L 15/07 |
| 11,886,826 | B1 * | 1/2024 | Bavarian ............... G06F 40/253 |
| 12,061,970 | B1 * | 8/2024 | Lo ............................ G06N 3/10 |
| 2007/0233487 | A1 | 10/2007 | Cohen et al. |
| 2017/0270929 | A1 | 9/2017 | Aleksic et al. |
| 2018/0293977 | A1 | 10/2018 | Liensberger |
| 2019/0340202 | A1 | 11/2019 | Kandur Raja et al. |

(Continued)

OTHER PUBLICATIONS

Karan Singhal et al., Large Language Models Encode Clinical Knowledge, Dec. 26, 2022, arxiv.org, https://arxiv.org/abs/2212.13138.

(Continued)

*Primary Examiner* — Leonard Saint-Cyr
(74) *Attorney, Agent, or Firm* — Dhiraj Jindal; PATENT YOGI LLC

(57) ABSTRACT
Disclosed herein is a method for facilitating customizable communications with users. The method may include receiving at least one input associated with at least one user from at least one user device associated with the at least one user, analyzing the at least one input, identifying at least one instruction from a plurality of instructions based on the analyzing of the at least one input, and obtaining at least one output using at least one language model based on the at least one input and the at least one instruction. Further, the method may include transmitting the at least one output to the at least one user device. Further, the method may include storing the at least one input and the at least one output.

18 Claims, 18 Drawing Sheets

(56) References Cited

U.S. PATENT DOCUMENTS

| | | | |
|---|---|---|---|
| 2020/0058294 | A1 | 2/2020 | Ahn et al. |
| 2020/0185102 | A1 | 6/2020 | Leventhal et al. |
| 2022/0199205 | A1 | 6/2022 | Shriberg et al. |
| 2022/0351296 | A1 | 11/2022 | Costaceque-Cecchi-Dimeglio et al. |
| 2023/0351120 | A1* | 11/2023 | Gelfenbeyn ........... G06N 3/006 |
| 2023/0351142 | A1* | 11/2023 | Gelfenbeyn ............ G06F 40/30 |
| 2023/0351216 | A1* | 11/2023 | Gelfenbeyn ........... G06N 3/006 |
| 2023/0351217 | A1* | 11/2023 | Gelfenbeyn ............ A63F 13/58 |
| 2023/0351254 | A1* | 11/2023 | Gelfenbeyn ........... G06N 20/00 |
| 2023/0351681 | A1* | 11/2023 | Gelfenbeyn ............ G06T 17/00 |

OTHER PUBLICATIONS https://artificialintelligence.health/AI-health-coach.html, artificialintelligence.health, https://artificialintelligence.health/AI-health-coach.html.

The first AI designed for mental health, Ash/Slingshot AI, https://www.talktoash.com/.

Slingshot AI, https://slingshotai.com/.

Mental health, redefined, Wysa Ltd, https://www.wysa.com/.

Mental health needs have multiplied. Support hasn't., Woebot Health, https://woebothealth.com/.

Health. Powered by Ada., Ada Health, https://ada.com/.

Accurate and efficient care with our symptom checker and virtual triage, Infermedica, https://infermedica.com/.

SThe clinical AI assistant for referral and assessment, Limbic, https://www.limbic.ai/access.

The AI companion who cares, Replika, https://replika.com/.

Health Bot, Microsoft, https://azure.microsoft.com/en-us/products/bot-services/health-bot.

Med-PaLM, Google Research, https://sites.research.google/med-palm/.

Andy Abramson, A new, personal health coach is coming to Fitbit, Aug. 20, 2025, Fitbit, Google, https://blog.google/products/fitbit/fitbit-ai-personal-health-coach-preview/.

Get your healthcare data AI-ready, Verily, https://verily.com/.

Microsoft Dragon Copilot, Microsoft, https://www.microsoft.com/en-us/health-solutions/clinical-workflow/dragon-copilot.

* cited by examiner

- AT LEAST ONE INPUT
- AT LEAST ONE OUTPUT
- AT LEAST ONE QUERY
- A CREDIBILITY SCORE

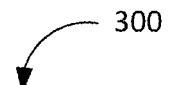

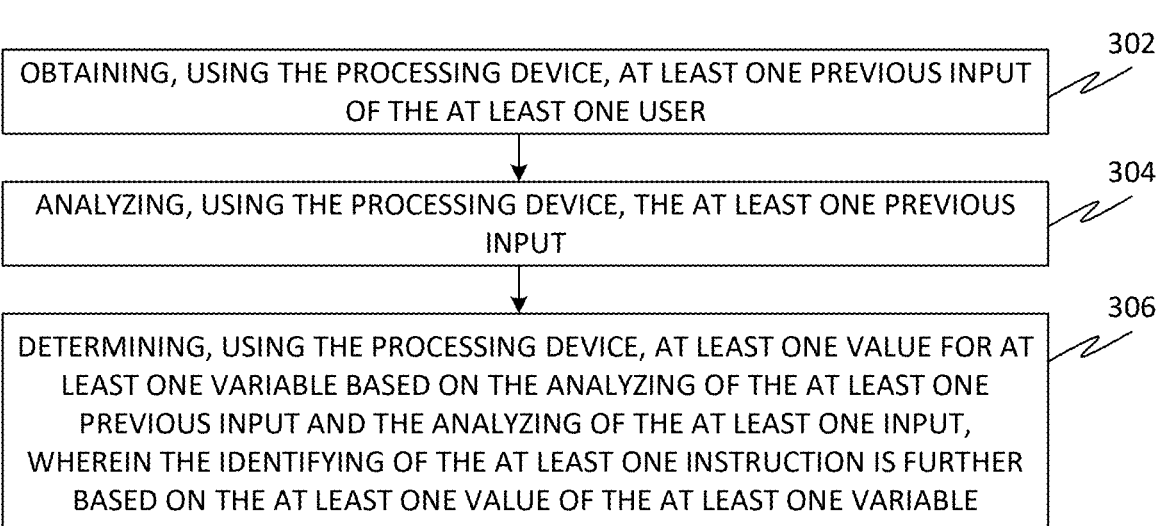

| 302 |

OBTAINING, USING THE PROCESSING DEVICE, AT LEAST ONE PREVIOUS INPUT OF THE AT LEAST ONE USER

| 304 |

ANALYZING, USING THE PROCESSING DEVICE, THE AT LEAST ONE PREVIOUS INPUT

| 306 |

DETERMINING, USING THE PROCESSING DEVICE, AT LEAST ONE VALUE FOR AT LEAST ONE VARIABLE BASED ON THE ANALYZING OF THE AT LEAST ONE PREVIOUS INPUT AND THE ANALYZING OF THE AT LEAST ONE INPUT, WHEREIN THE IDENTIFYING OF THE AT LEAST ONE INSTRUCTION IS FURTHER BASED ON THE AT LEAST ONE VALUE OF THE AT LEAST ONE VARIABLE

FIG. 3

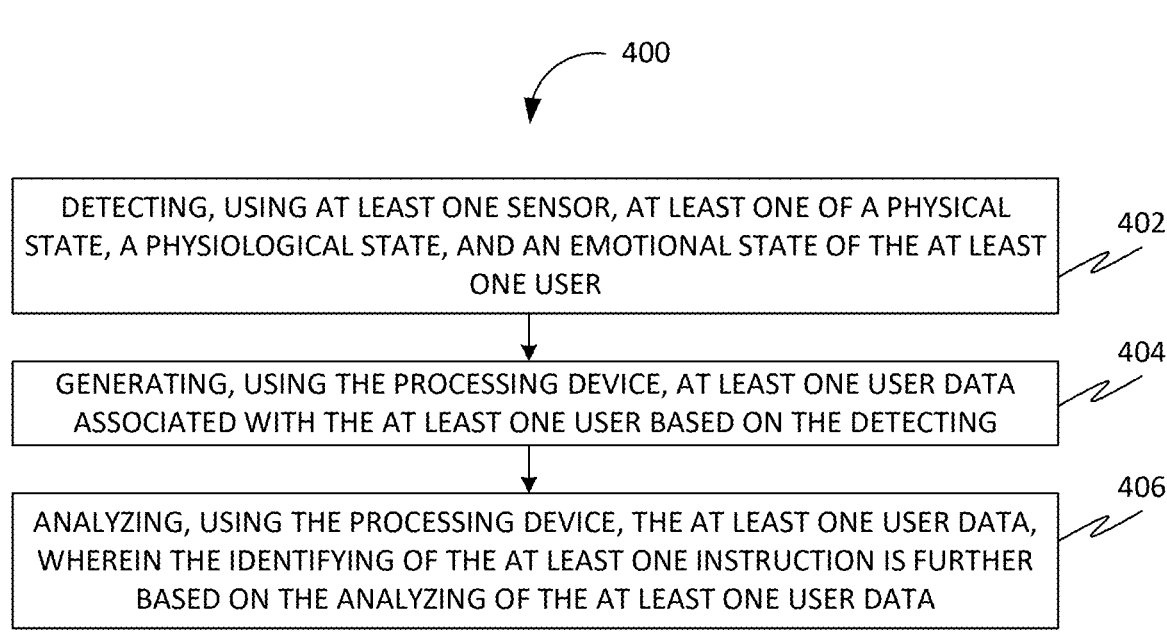

400

DETECTING, USING AT LEAST ONE SENSOR, AT LEAST ONE OF A PHYSICAL STATE, A PHYSIOLOGICAL STATE, AND AN EMOTIONAL STATE OF THE AT LEAST ONE USER          402

GENERATING, USING THE PROCESSING DEVICE, AT LEAST ONE USER DATA ASSOCIATED WITH THE AT LEAST ONE USER BASED ON THE DETECTING          404

ANALYZING, USING THE PROCESSING DEVICE, THE AT LEAST ONE USER DATA, WHEREIN THE IDENTIFYING OF THE AT LEAST ONE INSTRUCTION IS FURTHER BASED ON THE ANALYZING OF THE AT LEAST ONE USER DATA          406

FIG. 4

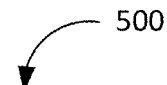

500

| 502 |
| ANALYZING, USING THE PROCESSING DEVICE, THE AT LEAST ONE OUTPUT BASED ON AT LEAST ONE CRITERION |

| 504 |
| DETERMINING, USING THE PROCESSING DEVICE, AN APPROPRIACY OF THE AT LEAST ONE OUTPUT FOR THE AT LEAST ONE USER BASED ON THE ANALYZING OF THE AT LEAST ONE OUTPUT, WHEREIN THE APPROPRIACY COMPRISES A POSITIVE APPROPRIACY AND A NEGATIVE APPROPRIACY, WHEREIN THE TRANSMITTING OF THE AT LEAST ONE OUTPUT IS BASED ON THE POSITIVE APPROPRIACY OF THE AT LEAST ONE OUTPUT |

FIG. 5

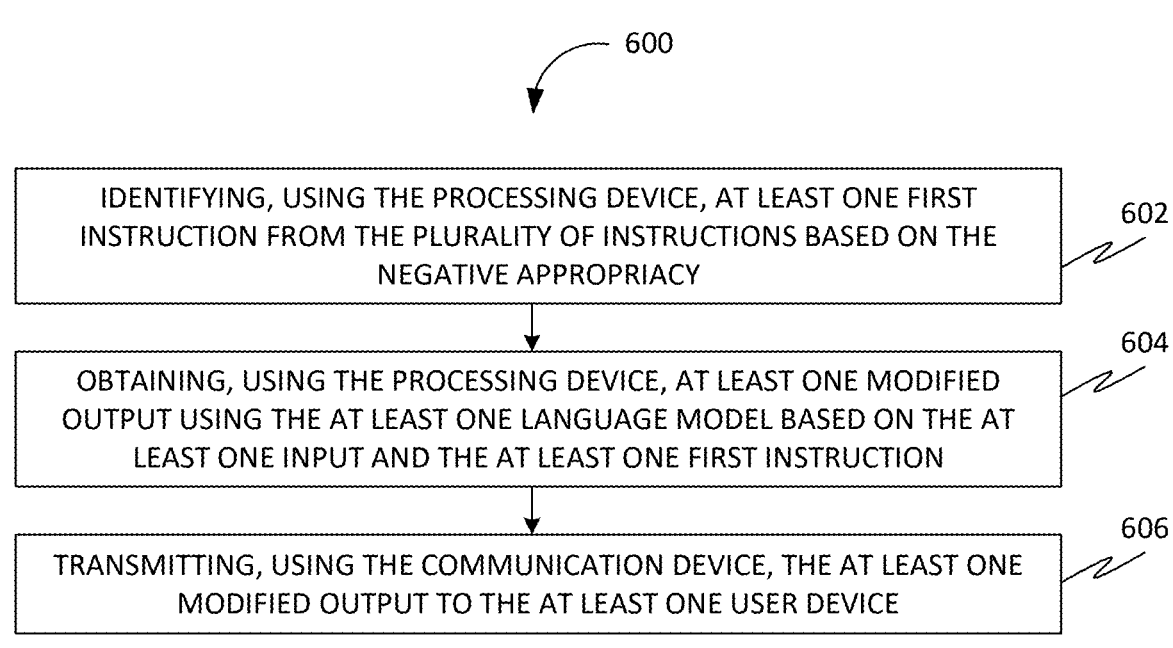

600

IDENTIFYING, USING THE PROCESSING DEVICE, AT LEAST ONE FIRST INSTRUCTION FROM THE PLURALITY OF INSTRUCTIONS BASED ON THE NEGATIVE APPROPRIACY

602

OBTAINING, USING THE PROCESSING DEVICE, AT LEAST ONE MODIFIED OUTPUT USING THE AT LEAST ONE LANGUAGE MODEL BASED ON THE AT LEAST ONE INPUT AND THE AT LEAST ONE FIRST INSTRUCTION

604

TRANSMITTING, USING THE COMMUNICATION DEVICE, THE AT LEAST ONE MODIFIED OUTPUT TO THE AT LEAST ONE USER DEVICE

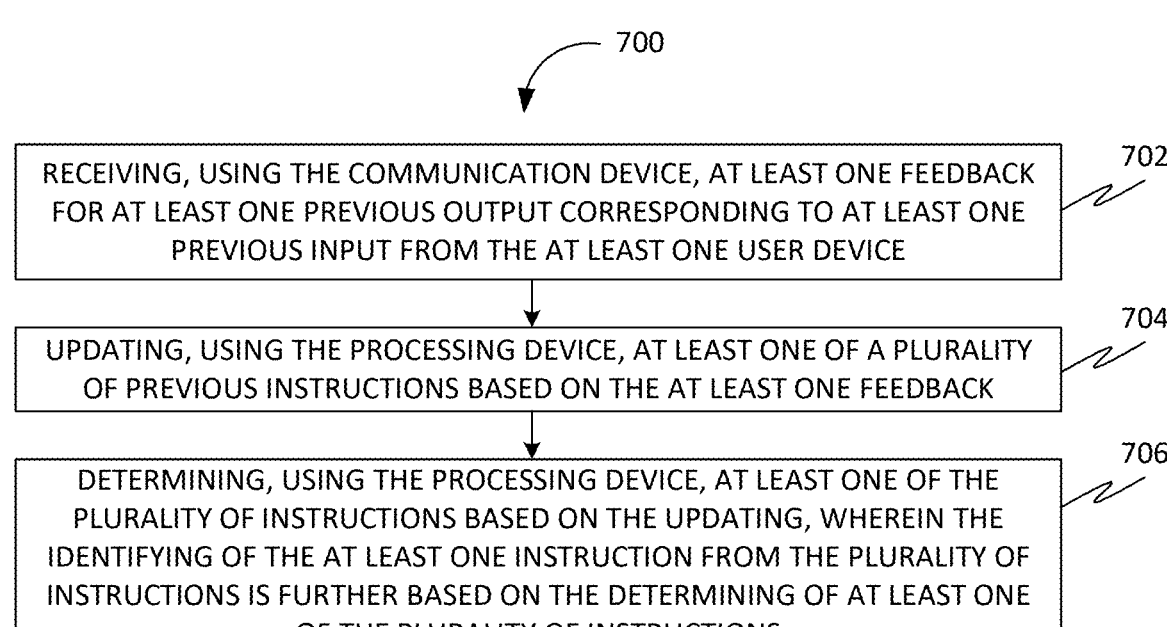

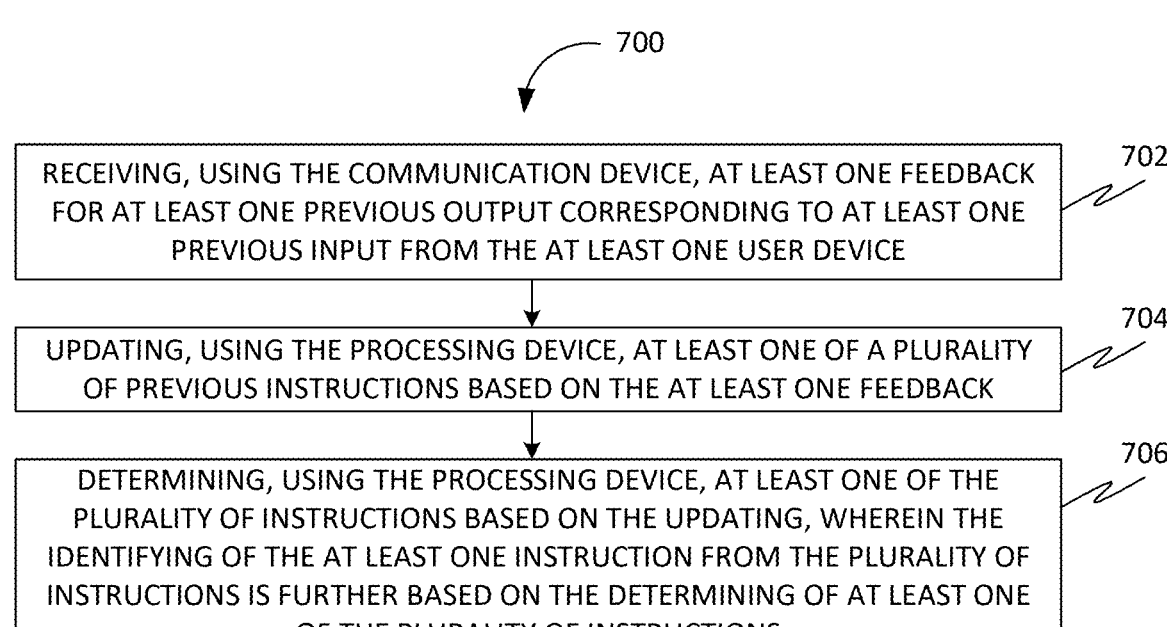

700

RECEIVING, USING THE COMMUNICATION DEVICE, AT LEAST ONE FEEDBACK FOR AT LEAST ONE PREVIOUS OUTPUT CORRESPONDING TO AT LEAST ONE PREVIOUS INPUT FROM THE AT LEAST ONE USER DEVICE

702

UPDATING, USING THE PROCESSING DEVICE, AT LEAST ONE OF A PLURALITY OF PREVIOUS INSTRUCTIONS BASED ON THE AT LEAST ONE FEEDBACK

704

DETERMINING, USING THE PROCESSING DEVICE, AT LEAST ONE OF THE PLURALITY OF INSTRUCTIONS BASED ON THE UPDATING, WHEREIN THE IDENTIFYING OF THE AT LEAST ONE INSTRUCTION FROM THE PLURALITY OF INSTRUCTIONS IS FURTHER BASED ON THE DETERMINING OF AT LEAST ONE OF THE PLURALITY OF INSTRUCTIONS

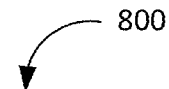

800

| ANALYZING, USING THE PROCESSING DEVICE, THE AT LEAST ONE INSTRUCTION | 802 |

| IDENTIFYING, USING THE PROCESSING DEVICE, AT LEAST ONE PORTION OF AT LEAST ONE DATA BASED ON THE ANALYZING OF THE AT LEAST ONE INSTRUCTION, WHEREIN THE AT LEAST ONE LANGUAGE MODEL IS FURTHER CONFIGURED FOR ACCESSING THE AT LEAST ONE PORTION OF THE AT LEAST ONE DATA BASED ON THE IDENTIFYING, WHEREIN THE GENERATING OF THE AT LEAST ONE OUTPUT IS FURTHER BASED ON THE ACCESSING OF THE AT LEAST ONE PORTION OF THE AT LEAST ONE DATA | 804 |

FIG. 8

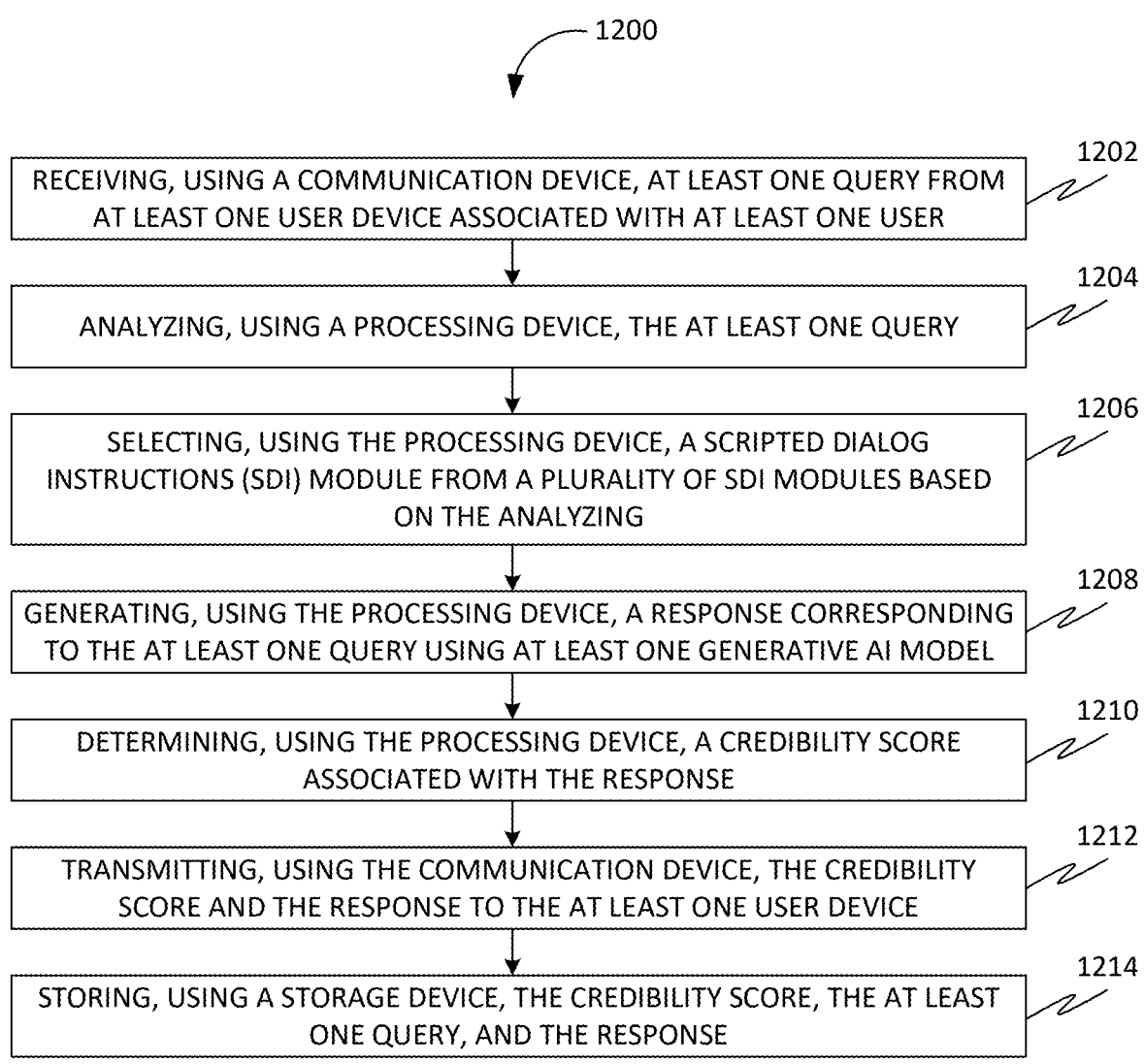

1200

1202

RECEIVING, USING A COMMUNICATION DEVICE, AT LEAST ONE QUERY FROM AT LEAST ONE USER DEVICE ASSOCIATED WITH AT LEAST ONE USER

1204

ANALYZING, USING A PROCESSING DEVICE, THE AT LEAST ONE QUERY

1206

SELECTING, USING THE PROCESSING DEVICE, A SCRIPTED DIALOG INSTRUCTIONS (SDI) MODULE FROM A PLURALITY OF SDI MODULES BASED ON THE ANALYZING

1208

GENERATING, USING THE PROCESSING DEVICE, A RESPONSE CORRESPONDING TO THE AT LEAST ONE QUERY USING AT LEAST ONE GENERATIVE AI MODEL

1210

DETERMINING, USING THE PROCESSING DEVICE, A CREDIBILITY SCORE ASSOCIATED WITH THE RESPONSE

1212

TRANSMITTING, USING THE COMMUNICATION DEVICE, THE CREDIBILITY SCORE AND THE RESPONSE TO THE AT LEAST ONE USER DEVICE

1214

STORING, USING A STORAGE DEVICE, THE CREDIBILITY SCORE, THE AT LEAST ONE QUERY, AND THE RESPONSE

FIG. 12

METHODS, SYSTEMS, APPARATUSES, AND DEVICES FOR FACILITATING CUSTOMIZABLE COMMUNICATIONS WITH USERS

REFERENCE TO RELATED APPLICATIONS

This application is a US bypass continuation application of the PCT/IB2024/056514 filed on Jul. 3, 2024, titled "METHODS, SYSTEMS, APPARATUSES, AND DEVICES FOR FACILITATING CUSTOMIZABLE COMMUNICATIONS WITH USERS", which in turn claims the benefit of U.S. Provisional Patent Application No. 63/525, 020, titled "METHODS AND SYSTEMS FOR FACILITATING HYBRID USE OF SCRIPTED DIALOG AND GENERATIVE ARTIFICIAL INTELLIGENCE MODELS IN WELL-BEING OF AN INDIVIDUAL", filed on Jul. 5, 2023, each of which is incorporated by reference herein in its entirety.

FIELD OF THE INVENTION

Generally, the present disclosure relates to the field of data processing. More specifically, the present disclosure relates to methods, systems, apparatuses, and devices for facilitating customizable communications with users.

BACKGROUND OF THE INVENTION

The field of data processing is technologically important to several industries, business organizations, and/or individuals.

Existing techniques for facilitating customizable communications with users are deficient with regard to several aspects. Artificial Intelligence ("AI") and generative AI models ("GM") have shown great potential in fields like healthcare, personal assistance, and mental well-being, but their use also poses significant challenges. One such challenge is the risk of GMs. For instance, current technologies do not combine the flexibility of GMs with the reliability of a scripted approach. Further, current technologies using GMs generate hallucinations or misinformation, which can be particularly problematic in sensitive fields like healthcare. Furthermore, current technologies do not craft appropriate prompts using hybrid dialog techniques to help control a flow of a conversation.

Therefore, there is a need for improved methods, systems, apparatuses, and devices for facilitating customizable communications with users that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method for facilitating customizable communications with users, in accordance with some embodiments. Accordingly, the method may include receiving, using a communication device, at least one input associated with at least one user from at least one user device associated with the at least one user. Further, the method may include analyzing, using a processing device, the at least one input. Further, the method may include identifying, using the processing device, at least one instruction from a plurality of instructions based on the analyzing of the at least one input. Further, the method may include obtaining, using the processing device, at least one output using at least one language model based on the at least one input and the at least one instruction. Further, the obtaining of the at least one output may include determining at least one value to at least one parameter associated with the at least one language model based on the at least one instruction. Further, the obtaining of the at least one output may include inputting the at least one input to the at least one language model based on the determining. Further, the at least one language model may be configured for generating the at least one output based on the at least one value of the at least one parameter and the at least one input. Further, the method may include transmitting, using the communication device, the at least one output to the at least one user device. Further, the method may include storing, using a storage device, the at least one input and the at least one output.

Further disclosed herein is a system for facilitating customizable communications with users, in accordance with some embodiments. Accordingly, the system may include a communication device configured for receiving at least one input associated with at least one user from at least one user device associated with the at least one user. Further, the communication device may be configured for transmitting at least one output to the at least one user device. Further, the system may include a processing device communicatively coupled with the communication device. Further, the processing device may be configured for analyzing the at least one input. Further, the processing device may be configured for identifying at least one instruction from a plurality of instructions based on the analyzing of the at least one input. Further, the processing device may be configured for obtaining the at least one output using at least one language model based on the at least one input and the at least one instruction. Further, the obtaining of the at least one output may include determining at least one value to at least one parameter associated with the at least one language model based on the at least one instruction. Further, the obtaining of the at least one output may include inputting the at least one input to the at least one language model based on the determining. Further, the at least one language model may be configured for generating the at least one output based on the at least one value of the at least one parameter and the at least one input. Further, the system may include a storage device communicatively coupled with the processing device. Further, the storage device may be configured for storing the at least one input and the at least one output.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 3 is a flowchart of a method 300 for facilitating customizable communications with users, in accordance with some embodiments.

FIG. 4 is a flowchart of a method 400 for facilitating customizable communications with users, in accordance with some embodiments.

FIG. 5 is a flowchart of a method 500 for facilitating customizable communications with users, in accordance with some embodiments.

FIG. 6 is a flowchart of a method 600 for facilitating customizable communications with users, in accordance with some embodiments.

FIG. 7 is a flowchart of a method 700 for facilitating customizable communications with users, in accordance with some embodiments.

FIG. 8 is a flowchart of a method 800 for facilitating customizable communications with users, in accordance with some embodiments.

FIG. 12 is a flow chart of a method 1200 for facilitating hybrid use of scripted dialog and generative AI models in well-being of an individual, in accordance with some embodiments.

DETAIL DESCRIPTIONS OF THE INVENTION

Figure 1:
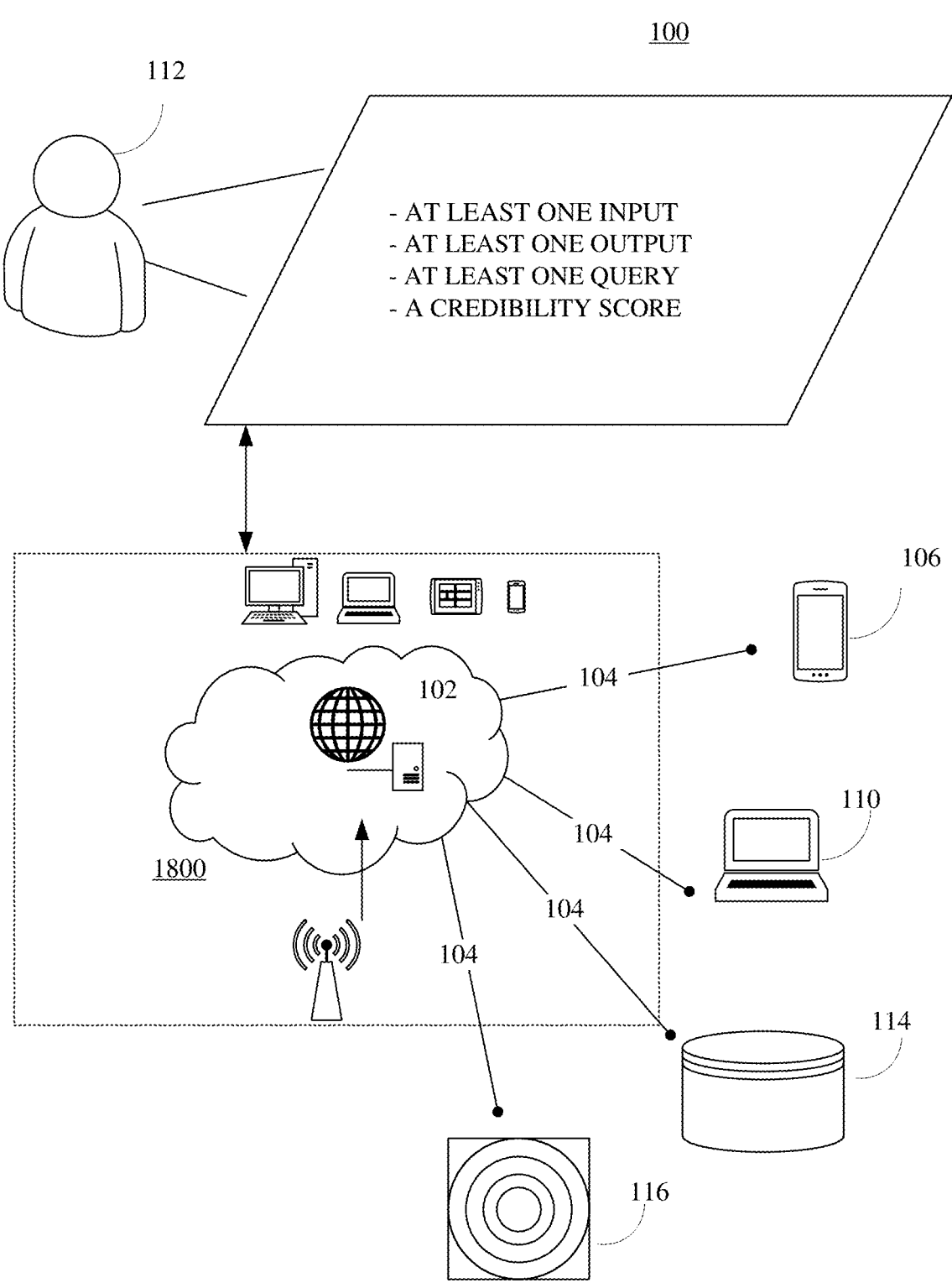
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term-differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for facilitating customizable communications with users, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smart-card with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors. Further, a video of the animal (such as a dog, etc.) making sounds (such as barking) may be fed to a generative pre-trained transformer (GPT) for building a language model. Further, the building of the language model requires a new vocab and a map to an existing embedding space, which is another language. Further, it may be implemented on a chip that might be put in a collar of the animal.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes methods, systems, apparatuses, and devices for facilitating customizable communications with users. Further, the disclosed system may be configured for facilitating hybrid use of scripted dialog and generative artificial intelligence models in well-being of an individual. Further, the disclosed system may be a hybrid AI system for task-oriented and safe GM interface. Further, the disclosed system addresses the challenge of controlling the responses of GMs, particularly in sensitive fields such as healthcare, mental health, and personal assistance. Further, the disclosed system may be configured for managing the risk of misinformation or inappropriate responses by GMs and providing a mechanism for effective and safe interaction with users by guiding the GMs through a system of scripted meta-instructions. Further, the disclosed system may be configured to effectively adapt to different scenarios and switch contexts or instructions based on the user's state, interaction, or intent. Further, the disclosed system may be configured to combine domain-specific, context-aware instruction sets with the broad capabilities of the GM. Further, the disclosed system may be configured to fully harness the GM's potential, particularly in dynamic and sensitive areas such as healthcare assistance, personal assistance, education service, customer service, etc.

Further, in some embodiments, the disclosed system may employ a hybrid of scripted dialogue instructions with a language model for specific tasks and contexts. Further, the language model may include a generative model (GM), a non-generative model, a heuristic model, etc. By providing a set of dynamic and flexible high-level instructions, the GM may be guided toward more precise and safe interaction outcomes while preserving the inherent advantages of its conversational ability.

Further, the innovation lies in this systematic integration of structured, context-aware instruction sets into the functioning of the GM, which can be defined, adjusted, and swapped based on user interactions or specific needs of the task at hand. Further, the disclosed system may be configured to significantly improve the user interaction experience across multiple domains, particularly in healthcare, where the balance between precision and empathy is of paramount importance. The system has several key advantages over existing solutions:

Flexibility: Unlike static scripts or hard-coded rules, the approach allows for more dynamic interactions while ensuring safety and reliability.

Adaptability: The system may switch between different instruction sets or modules depending on the user's state or intent, ensuring the relevance and appropriateness of the responses.

Context-Aware: The GM may adopt a specific persona, avoid sensitive topics, or utilize specific sets of knowledge based on the provided instructions, catering to a broad range of contexts.

Supervised Learning and Feedback Loop: The system allows for ongoing updates to the instruction sets based on user feedback, new knowledge, or changing regulations, enhancing the system's performance over time.

Safety Measures: Integrated risk management mechanisms monitor the GM's output to ensure that it remains within operational boundaries, minimizing the risks of misinformation or inappropriate responses.

Overall, the disclosed system enhances the effective and safe utilization of GMs in specific and dynamic tasks, outperforming existing solutions that struggle with the balance between control and conversational richness.

Further, the GM may be the core AI model that interacts with the user through the user interaction interface, generating and understanding natural language responses. Further, the GM operates according to Scripted Dialog Instructions (SDIs), which provide task-specific or context-aware guidance. These instructions form the basis of how the GM communicates and interacts with users. For instance, these instructions may set a specific Persona for the GM to adopt during the interaction or guide the GM to perform a particular task, such as conducting a patient interview or a coaching session. Further, the task-specific or context-aware guidance enhances reliability and user experience. Further, the communication generated using the SDI is tailored based on the computing device used by the user to interact, and its capabilities and limitations (e.g. smartphone, desktop computer, Plain Old Telephone Service (POTS) telephone, etc.). Further, the application may be using a base language (e.g. English) and dynamically translates the GM's output for the user, and the user's responses, so that the interaction occurs in the language selected by the user. Further, the interaction of the user is monitored for significant events that require the system to adapt, adjust its strategy, or alert others to ensure the safety of the user.

Further, the disclosed system uses the best model for each element of the dialog and background processing.

Further, the disclosed system may use deterministic and genAI (generative AI (GM)) hybrid for interacting with the user.

Further, the system may be associated with a Risk Management Mechanism that may be a safety net system that monitors the output of the GM. Further, the risk management mechanism ensures that the GM's responses stay within predefined operational boundaries, protecting users from receiving potentially harmful or inappropriate information.

When the Risk Management Mechanism detects a possible breach of these boundaries, an alert system is triggered, providing warnings, stopping, or modifying the GM from sending the response.

Further, the system may be associated with an Instruction Set Repository that may be a stored database of SDIs, which developers, medical professionals, or AI specialists update to control the GM's behavior, introduce new tasks, or improve existing functions. This repository is utilized by a supervised learning mechanism to continually train and improve the GM's responses and interactions.

Further, the system may be associated with a Knowledge Suppression Mechanism that allows for the control of the information the GM can share with users. For instance, the knowledge suppression mechanism may ensure that the GM refrains from providing outdated medical advice or revealing sensitive data.

Further, the system may be associated with a User State Monitor that tracks user responses and adjusts the GM's interaction approach accordingly. This system might trigger the GM to switch to a different context-aware module when the user shows signs of distress, for example.

The integration interface for external systems and devices allows the system to incorporate data from third-party sources such as wearables or other medical devices, enriching the interaction with the user and providing a more holistic approach.

The system also includes specific functional components like personal assistant functionality, mental well-being support functionality, life coaching functionality, education functionality, customer service functionality, healthcare functionality, etc. that can be activated based on user needs or context.

Finally, the system may provide a feedback loop that provides a mechanism for users to provide input on the system's performance, which can be used to further refine and improve the GM's operation.

Each component of the disclosed system works both individually and in concert with other components to deliver the desired functions:

Further, the GM serves as the core of the AI system, generating and interpreting natural language to interact with the user. Further, the GM operates both independently and in line with instructions provided by the Scripted Dialog Instructions (SDIs). Further, the GM performs reasoning to assess when intermediate goals defined in the Scripted Dialog Instructions have been achieved.

Further, the User Interaction Interface may be the medium through which the GM communicates with the user. Further, the user interaction interface handles user inputs and presents responses generated by the GM. Further, the system may also toggle between providing deterministic responses to the user inputs and providing GM's responses to the user inputs.

Further, the Scripted Dialog Instructions (SDIs) may guide the GM in its interactions, directing its behavior and responses. Further, the SDIs provide the instructions that determine how the GM interacts with the user, dictating tasks to accomplish, personas to adopt, and boundaries to respect.

Further, the Risk Management Mechanism operates independently, monitoring the outputs of the GM and ensuring that they stay within predefined operational boundaries. Further, the RMM collaborates with the Alert System to prevent inappropriate or potentially harmful outputs.

Further, the alert system may work in tandem with the Risk Management Mechanism. Further, the alert system provides warnings, halts, or modifies the GM when a breach of operational boundaries is detected.

Further, the Instruction Set Repository stores the SDIs and serves as a reference for the Supervised Learning Mechanism. Further, the instruction set repository aids in the continuous learning and improvement of the GM's responses and interactions.

Further, the Supervised Learning Mechanism leverages the Instruction Set Repository to refine the system's performance over time, incorporating updates and new instructions from developers, medical professionals, and AI specialists.

Further, the Knowledge Suppression Mechanism restricts the GM's access to certain information, ensuring it does not reveal sensitive or outdated data.

Further, the User State Monitor monitors the user's emotional and interaction states and directs the GM to switch between modules as appropriate, ensuring an empathetic and contextually sensitive response.

Further, the disclosed system may be associated with an Integration Interface for External Systems and Devices that interfaces with third-party devices or systems, enabling the system to consider additional data in its interactions with the user.

Further, the disclosed system may be associated with Specific Functional Components. Further, the specific functional components may include modules (e.g., Personal Assistant Functionality, Mental Well-being Support Functionality, Life Coaching Functionality, Education Functionality, Customer Service Functionality, Healthcare Functionality, etc.) activated based on user needs or context, guiding the GM's approach in various scenarios.

Further, the Feedback Loop mechanism allows the system to incorporate user feedback, contributing to the system's continuous learning and improvement process. Further, the feedback loop mechanism works hand-in-hand with the Supervised Learning Mechanism and the Instruction Set Repository.

In summary, each component of the disclosed system has its specific functionality but also collaborates with other components to create a holistic, adaptive, and safe AI interaction system. This combined operation enables the system to deliver context-aware, empathetic, and effective assistance in various domains, including healthcare, mental well-being, life coaching, education, customer service, personal assistance, etc.

Further, the generative AI model (GM), which may include but is not limited to Large Language Models (LLMs), may be developed using various machine learning architectures such as transformer-based, recurrent neural network (RNN)-based, or seq2seq architectures, which are trained on extensive corpora of data, not limited to text. The training process for these models may involve predicting the next element in a sequence—such as the next word in a sentence for language models—which assists the model in understanding the context, semantics, and patterns within the data. Additionally, the training can leverage a range of techniques, including unsupervised, semi-supervised, and supervised learning approaches."

Further, the creation of the User Interaction Interface may involve developing a front-end interface that enables interaction between the GM and the user. Further, the user interaction interface may be created using various programming languages and libraries suitable for developing graphical user interfaces.

Further, the construction of the Scripted Dialog Instructions (SDIs) may involve creating a set of instructions that guide the GM during interactions. These instructions may be created by developers, medical professionals, and AI specialists to cover a wide range of scenarios, tasks, and behaviors.

Further, for incorporation of the Risk Management Mechanism, the disclosed system may monitor the output of the GM and check for potential risks or violations of operational boundaries. Further, an alert system may be implemented that triggers warnings or halts the system when a boundary breach is detected.

Further, development of the Instruction Set Repository may need the setting up of a repository to store all the SDIs.

Further, the repository may be a database, a cloud-based storage system, a network attached storage system, a hardware storage system (such as hard disks, solid state storage, etc.), a distributed storage system, etc.

Further, for the establishment of the Supervised Learning Mechanism, a mechanism may be implemented that refines the GM's responses over time. This may involve periodic retraining of the GM on new data, incorporating updates and new instructions from the Instruction Set Repository.

Further, for implementation of the Knowledge Suppression Mechanism, a mechanism may be needed to be created that controls the GM's access to certain knowledge, preventing it from revealing sensitive or outdated information.

Further, to set up the User State Monitor, a mechanism to monitor the user's emotional and interaction states and adapt the GM's behavior accordingly may be created.

Further, for integration with External Systems and Devices, an integration interface may be needed to set up that allows the GM to interface with third-party devices or systems, enhancing its ability to assist users in a variety of contexts.

Further, for development of Specific Functional Components, specific modules for personal assistance, mental well-being support, life coaching, education, customer service, healthcare, etc. may be developed, each guided by its own set of SDIs.

Further, for creation of the Feedback Loop, the system may be established that captures user feedback and integrates it into the system's continuous learning and improvement process.

Further, for testing and iteration, the system may need to be thoroughly tested to ensure its functionality and safety. The development process may likely involve many iterations, continually refining the system based on user feedback and testing results.

Further, in some embodiments, the disclosed method may include accessing an interface. The user first accesses the system via the developed interface. This may be a web-based interface, a standalone software application, or an integrated component of another system.

Further, the method may include inputting a user request or question. The user then inputs their query or request. This may be in the form of a typed question, a voice command, or any other form of communicative input the system is designed to process.

Further, the method may include the system consulting Scripted Dialog Instructions (SDIs). Upon receiving the input, the system refers to the appropriate SDIs which have been designed to guide the GM in forming a response. The specific SDIs used may depend on the nature of the user's input and the current task or context.

Further, the method may include the system using the guidance from the SDIs to generate a response that is most suitable to the user's query. The actual language of the response is generated by the GM, but it is guided by the instructions in the SDIs.

Further, the method may include the user interacting with the system. The user interacts with the system in a conversational manner, with the system using the appropriate SDIs to guide the GM's responses.

Further, the method may include the system adapting based on a user state. If the system detects that the user is in a particular state (e.g., distressed), the system may switch to another module or set of SDIs to better assist the user. For instance, the system starts a mindfulness exercise if the user is stressed.

Further, the method may include the system alerting or stopping if necessary. If at any point the system detects that it's about to give an inappropriate or potentially harmful response, it may trigger an alert, stop, or modify itself due to the in-built risk management mechanism.

Further, the method may include the user getting assistance from the system. Further, the user receives assistance in a wide variety of contexts, including but not limited to healthcare, personal assistance, mental well-being, education, customer service, life coaching, etc. The system follows the instructions provided by the relevant SDIs to assist the user.

Further, the method may include feedback and continual improvement. The user may provide feedback, that may be incorporated into the Instruction Set Repository to help refine the SDIs and enhance the system's effectiveness. This forms part of a continuous learning loop, where the system improves over time based on user feedback and interaction data.

Further, the method may include external system and device integration. If the user is using a connected wearable or any other device, the system may pull relevant data from these devices, enhancing its ability to assist users.

Further, the disclosed system may be an AI-based system that utilizes a hybrid approach of GMs and scripted dialog for user interaction. The system leverages the benefits of both to achieve specific tasks and manage risks associated with GM hallucinations or misinformation. Further, the system has applications in various fields including healthcare, behavioral health, personal assistance, life coaching, education, customer service, mental well-being, etc.

The disclosed system pertains to the field of artificial intelligence (AI), particularly the use of generative AI models (GMs), in healthcare, behavioral health, personal assistance, life coaching, mental well-being, etc. Further, the system hybridizes the application of GMs and scripted dialog to guide user interactions, achieve specific tasks, and manage the risks associated with GM hallucinations or misinformation.

The system utilizes both GMs and a meta layer of scripted instructions to facilitate and manage user interactions. Developers, medical professionals, or AI specialists prepare these instructions, which are designed to guide the GM in its conversations with users, as well as dictate what information the GM can divulge. The scripted instructions may be specific or general, and the GM fills in the details according to its underlying language model. The system may be adapted to new knowledge or user feedback without necessarily requiring the GM to be completely retrained. The GM may switch between modules based on user interactions to respond appropriately to the user's needs and emotional state.

The system uses GMs as a base for user interaction, utilizing a hybrid approach of GMs and a meta layer of scripted instructions to achieve specific tasks and manage risks. The GM is directed to accomplish tasks, adopt personas, or suppress or reveal certain information according to these scripted instructions, which can be updated over time by developers, medical professionals, or AI specialists. The GM follows these instructions while generating detailed responses based on its underlying language model.

In a patient interview module, for example, the GM may be directed to adopt an empathetic persona and ask the user a series of questions. If the user veers off-topic, the GM can redirect the user back to the task or trigger another module, such as a mindfulness session module if the user becomes distressed.

The system can also integrate with other wearables and systems for improved function, and it could be applied not only in healthcare, but also in behavioral health, personal assistance, life coaching, and mental well-being.

The idea behind the GM selection of the Scripted Dialog Instruction (SDI) is to allow the system to adaptively and dynamically respond to user inputs. The GM, with its ability to understand and generate human-like text, may analyze the user's input, assess the context, and then determine the appropriate SDI to apply. This allows for a flexible, interactive, and user-centered approach. Further, the system may also toggle between providing deterministic responses to the user inputs and GM's responses to the user inputs.

However, the process can be structured differently depending on the design and the use case. For example, in some applications, it might be more suitable for a different module (like a Decision-Making Module) to select the SDI based on the user's input and other variables, such as the user's past interactions, current mood or health status (if available), or the importance or sensitivity of the topic.

The decision about which part of the system selects the SDI may depend on how the developers balance the need for flexible responses (which GMs are good at) against the need for reliability and control (which scripted approaches are good at).

Further, the disclosed system may be configured for offering a GM solution that optimizes the control of its behavior. At a high level, the disclosed system may be configured for crafting a single prompt that is being sent to a GM. The prompt may be principally a string of text, image, audio, video, etc. The string is constructed by combining or referencing multiple files such as JSONs, databases, documents, etc. Provided access to a data source is available, the disclosed system may be used to help construct this string. For example, if the system had access to data from a user's smartwatch's heart rate, this value may be extracted and inserted into this string. Further, the disclosed system may adapt based on the user's state as represented in specialized sensor readings (e.g. sensors for detecting emotional state), wherein an accessible external data may be extracted to help craft the prompt for the GM. Further, the disclosed system may fine tune a GM and use that as a substitute for a previous GM. Further, the disclosed system may pre-empt some of the GM's behavior by specially crafting the prompt with certain parameters; this may be classified as a form of controlling the hyper-parameters. Further, the disclosed system may change the hyper-parameters of the GM (e.g. the temperature, etc.). Further, the disclosed system may be configured to capture the user's context/state/intent from external devices such as IoT devices (i.e. non-generic computing devices), wherein accessible external data may be extracted to help craft the prompt for the GM.

Further, in some embodiments, the disclosed system may be configured for facilitating dynamic and context-aware interactions using multiple GMs.

Further, the present disclosure describes a method for dynamically adapting dialog instructions in a customizable communication system. Further, the method may include receiving real-time user feedback during an interaction session. Further, the method may include analyzing the feedback using a processing device. Further, the method may include updating a set of scripted dialog instructions based on the analyzing. Further, the method may include applying the updated instructions in subsequent interactions to enhance the relevance and appropriateness of the communication.

Further, the present disclosure describes a method for integrating multiple AI models and external devices in a customizable communication system. Further, the method may include selecting appropriate AI models based on the task and user context. Further, the method may include receiving data from external devices, including wearable health devices and IoT sensors. Further, the method may include analyzing the combined data from the AI models and external devices to generate context-aware responses. Further, the method may include transmitting the generated responses to a user device.

Further, the present disclosure describes a method for personalizing interactions in a customizable communication system. Further, the method may include identifying user characteristics, including device type, intellectual level, and language preference. Further, the method may include tailoring the dialog instructions based on the identified user characteristics. Further, the method may include adjusting the communication style and content to match the user's literacy level, emotional IQ, and cognitive ability. Further, the method may include continuously monitoring and adapting the interaction based on real-time user responses and feedback.

Further, the present disclosure describes a system for dynamically adapting dialog instructions in a customizable communication platform. Further, the system may include a communication device, a processing device, and a storage device. Further, the communication device may be configured to receive real-time user feedback during interaction sessions. Further, the processing device may be configured to analyze the feedback and update a set of scripted dialog instructions based on the analysis. Further, the storage device may be configured to store the updated instructions for application in subsequent interactions to enhance the relevance and appropriateness of the communication.

Further, the present disclosure describes a system for integrating multiple AI models and external devices in a customizable communication platform. Further, the system may include a selection module, an integration module, a processing device, and a communication device. Further, the selection module may configured to choose appropriate AI models based on the task and user context. Further, the integration module may be configured to receive and process data from external devices, including wearable health devices and IoT sensors. Further, the processing device may be configured to analyze the combined data from the AI models and external devices to generate context-aware responses. Further, the communication device may be configured to transmit the generated responses to a user device.

Further, the present disclosure describes a system for personalizing interactions in a customizable communication platform. Further, the system may include a user profiling module, a personalization engine, and a monitoring module. Further, the user profiling module may be configured to identify user characteristics, including device type, intellectual level, and language preference. Further, the personalization engine may be configured to tailor dialog instructions based on the identified user characteristics. Further, the monitoring module may be configured to continuously monitor and adapt the interaction based on real-time user responses and feedback.

The present disclosure describes integration of curated content with generative models (GMs) for reliable, context-aware interactions (communications). Further, the curated content may include scripted dialog. The integration of the curated content with the generative model is used for providing appropriate prompts for controlling the flow of the conversation. The integration of the curated content with the generative model also prevents the generative model from hallucinating which would lead to a generation of inappropriate prompts by the generative model. The integration of the curated content with the generative model also prevents the generative model from producing misinformation that would obstruct the flow of the conversation.

FIG. 1 is an illustration of an online platform 100 consistent with various embodiments of the present disclosure. By way of non-limiting example, the online platform 100 for facilitating customizable communications with users may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, virtual reality (VR) devices, augmented reality (AR) device, etc.), databases 114, and sensors 116 over a communication network 104, such as, but not limited to, the Internet. Further, users of the online platform 100 may include relevant parties such as, but not limited to, end-users, administrators, service providers, service consumers, and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 1800.

Figure 2:
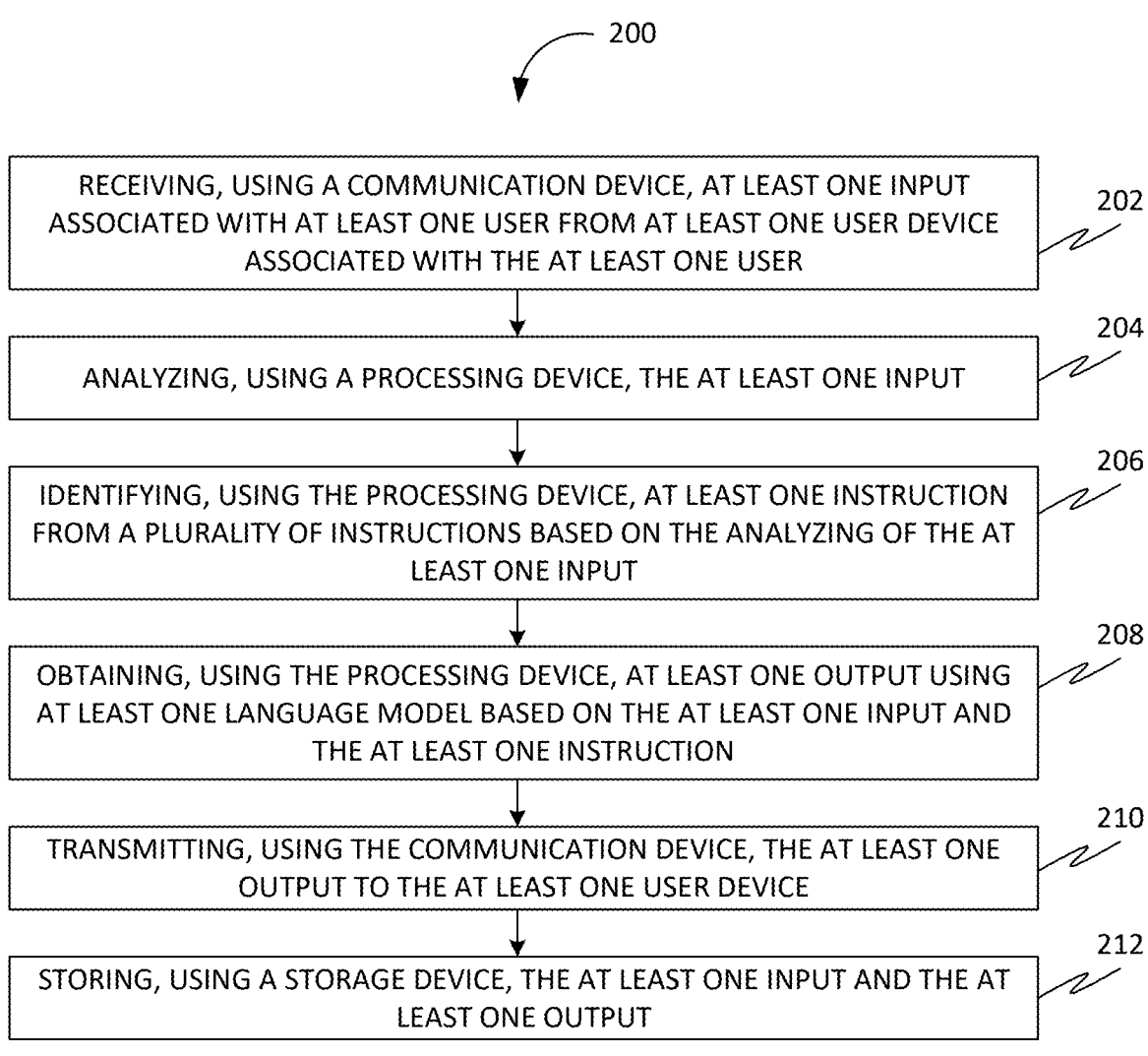
FIG. 2 is a flow chart of a method for facilitating customizable communications with users, in accordance with some embodiments.

FIG. 2 is a flow chart of a method 200 for facilitating customizable communications with users, in accordance with some embodiments. Accordingly, at 202, the method 200 may include receiving, using a communication device (such as a communication device 902), at least one input associated with at least one user from at least one user device (such as at least one user device 1102) associated with the at least one user. Further, the at least one input may include a query, a question, a dialog, etc., associated with the at least one user. Further, the at least one input may include a speech of the at least one user in at least one natural language. Further, the receiving of the at least one input may include receiving at least one query generated based on at least one user interface input of the at least one user via the at least one user device. Further, the at least one user device may include a computing device, a client device, an input device, etc. Further, in an embodiment, the at least one input may include at least one characteristic of the at least one user device. Further, the at least one characteristic corresponds to at least one of a capability and a limitation of the at least one device. Further, the at least one characteristic may include an output characteristic (such as visual, aural, haptic, etc.), a display characteristic (such as screen size, resolution, etc.), a processor capacity, a memory capacity, etc.

Further, at 204, the method 200 may include analyzing, using a processing device (such as a processing device 904), the at least one input.

Further, at 206, the method 200 may include identifying, using the processing device, at least one instruction from a plurality of instructions based on the analyzing of the at least one input. Further, the plurality of instructions may include a set of scripted dialog instructions. Further, the plurality of instructions may be stored in an instruction set repository. Further, the identifying of the at least one instruction may include retrieving the at least one instruction from the instruction set repository. Further, the at least one instruction may include a scripted dialog instruction. Further, the at least one instruction may include a script for the communications with the at least one user. Further, the plurality of instructions may be configured to be updated based on an analysis of a feedback comprising at least one of a pattern and an issue associated with at least one of the plurality of instructions. Further, the feedback may be configured to be obtained based on monitoring of the at least one input and the at least one output during a session (a communication session, an interaction session, etc.).

Further, at 208, the method 200 may include obtaining, using the processing device, at least one output using at least one language model based on the at least one input and the at least one instruction. Further, the obtaining of the at least one output may include determining at least one value to at least one parameter associated with the at least one language model based on the at least one instruction. Further, the at least one parameter may include hyper parameters, model parameters, additional parameters, etc. Further, the at least one parameter governs a behavior of the at least one language model. Further, the hyper parameters may include a temperature, a model size, a number of Epochs, a learning rate, a batch size, a decoding type, a penalty, etc., associated with the at least one language model. Further, the temperature corresponds to a context of the at least one input. Further, the at least one value of the at least one parameter may not be determined based on a training of the at least one language model. Further, the obtaining of the at least one output may include inputting the at least one input to the at least one language model based on the determining. Further, the at least one language model may be configured for generating the at least one output based on the at least one value of the at least one parameter and the at least one input. Further, the obtaining may include applying the at least one input and the at least one instruction to the at least one language model. Further, the at least one language model may be a large language model (LLM). Further, the at least one language model may be a generative artificial intelligence (AI) model (GM), a non-generative machine learning model, a heuristic model, etc. Further, the at least one language model may be an autoregressive decoder only transformer. Further, the at least one instruction may include at least one directive for the at least one language model for generating the at least one output. Further, the at least one directive corresponds to adopting at least one specific persona by the at least one language model, undertaking at least one specific task by the at least one language model, utilizing at least one specific information for generating outputs (responses), avoiding at least one specific information for generating outputs, etc. Further, the at least one instruction may be configured for controlling outputs generated by the at least one language model. Further, the at least one instruction may include a scripted dialog instruction. Further, the scripted dialog instruction provides a task-specific and/or context aware guidance. Further, in an embodiment, the at least one language model may be configured for tailoring the at least output based on the at least one characteristic. Further, at least one parameter of the at least one language model may be configured to be updated based on an analysis of a feedback comprising at least one of a pattern and an issue associated with the at least one language model. Further, the at least one parameter may include at least one model parameter and at least one hyper parameter of the at least one language model. Further, the feedback may be configured to be obtained based on monitoring of the at least one input and the at least one output during a session (a communication session, an interaction session, etc.).

Further, at 210, the method 200 may include transmitting, using the communication device, the at least one output to the at least one user device. Further, the transmitting may include providing the at least one output for presenting via the at least one user device based on the at least one input. Further, the at least one user device may include a presentation device, an output device, etc. Further, the at least one output may include at least one response to the at least one input. Further, the at least one output may include a speech in the at least one natural language.

Further, at 212, the method 200 may include storing, using a storage device (such as a storage device 906), the at least one input and the at least one output.

Further, in some embodiment, the at least one language model may be associated with at least one initial value of at least one model parameter and at least one initial value of at least one hyper parameter based on a training of the at least one language model using at least one dataset comprising at least one training sample. Further, the obtaining of the at least one output may include determining the at least one value of the at least one hyper parameter of the at least one language model.

Further, in some embodiments, the at least one instruction may include at least one step associated with at least one therapy. Further, the at least one language model may be configured for personalizing the at least one step of the at least one therapy for the at least one user based on the at least one input. Further, the at least one language model may be configured for embedding the at least one step in the at least one output based on the personalizing. Further, the generating of the at least one output may be based on the embedding.

Further, in some embodiments, the communications with the at least one user may include at least one interaction of the at least one user with the at least one language model. Further, the communications may correspond to a session with the at least one user.

Further, in some embodiments, the analyzing of the at least one input may include analyzing the at least one input using at least one machine learning model. Further, the at least one machine model may be configured for classifying at least one of a state and an intent for the at least one user based on the at least one input. Further, the identifying of the at least one instruction may be based on at least one of the state and the intent. Further, the at least one machine learning model may include a classifier language model. Further, the at least one machine learning model may be configured for performing a natural language processing. Further, the intent may include a specific task that at least one user desires to undertake. Further, the state may include an emotional state, a physical state, a physiological state, an interaction state, etc. of the at least one user. Further, the emotional state may include a state of anger, happiness, sadness, shame, exhaustion, disgust, fear, contempt, surprise, confusion, attentiveness, relaxation, frustration, boredom, embarrassment, etc. Further, the physical state may include a location, a movement, a gesture, an expression, an environment, etc. of the at least one user. Further, the physiological state may include a body temperature, a blood pressure, a respiration rate, a pulse rate, a heartbeat, etc. Further, in an embodiment, the at least one machine learning model may be trained through a supervised learning. Further, the at least one machine learning model may be configured for performing a pattern recognition for the classifying of at least one of the state and the intent for the at least one user based on the at least one input. Further, the classifying of at least one of the state and the intent for the at least one user based on the at least one input by the at least one machine learning model describes a novel implementation of the at least one machine learning model. Further, the novel implementation may be the classifying of at least one of the state and the intent for the at least one user by the at least one machine learning model.

Further, in some embodiments, the analyzing of the at least one input may include analyzing the at least one input using at least one machine learning model. Further, the at least one machine learning model may be configured for predicting at least one requirement of the at least one user. Further, the identifying of the at least one instruction may be based on the at least one requirement. Further, the at least one machine learning model may be configured for extracting at least one pattern associated with a behavior, a communication, etc., of the at least one user from the at least one user. Further, the at least one machine learning model may be configured for correlating the at least one pattern with at least one task based on the extracting. Further, the determining of the at least one requirement may be based on the correlating. Further, the predicting of the at least one requirement of the at least one user by the at least one machine learning model describes an advance application of the at least one machine learning model.

FIG. 3 is a flowchart of a method 300 for facilitating customizable communications with users, in accordance with some embodiments. Accordingly, at 302, the method 300 may include obtaining, using the processing device, at least one previous input of the at least one user. Further, the at least one previous input may include a previous query, a previous question, etc., associated with the at least one user. Further, the at least one previous input may include at least one historical portion of a conversation of the at least one user.

Further, at 304, the method 300 may include analyzing, using the processing device, of the at least one previous input.

Further, at 306, the method 300 may include determining, using the processing device, at least one value for at least one variable based on the analyzing of the at least one previous input and the analyzing of the at least one input. Further, the identifying of the at least one instruction may be based on the at least one value of the at least one variable. Further, the at least one variable may include a topic of the communications, a state of the at least one user, a characteristic (sensitivity, etc.) of the topic, an emotion of the at least one user, a task for the at least one user, a communication standard (a user language, a user literacy level, etc.) for the at least one user, an age of the at least one user, a gender of the at least one user, etc. Further, the identifying of the at least one instruction based on the at least one value of the at least one variable which may be determined based on the analyzing of the at least one previous input describes an ability to learn from previous interactions (communications) for enhancing the customization and accuracy of the communications.

FIG. 4 is a flowchart of a method 400 for facilitating customizable communications with users, in accordance with some embodiments. Accordingly, at 402, the method 400 may include detecting, using at least one sensor (such as at least one sensor 1002), at least one of a physical state, a physiological state, and an emotional state of the at least one user. Further, the detecting may include capturing at least one of the physical state, the physiological state, and the emotional state of the at least one user. Further, the at least one sensor may include a location sensor, a motion sensor, an image sensor (camera), an electro dermal activity sensor, a photo plethysmograph sensor, a chemical sensor, a biometric sensor, etc. Further, the at least one sensor may be comprised in a health monitoring system, a health monitoring device, etc. Further, the health monitoring device may include a wearable device.

Further, at 404, the method 400 may include generating, using the processing device, at least one user data associated with the at least one user based on the detecting.

Further, at 406, the method 400 may include analyzing, using the processing device, the at least one user data. Further, the identifying of the at least one instruction may be based on the analyzing of the at least one user data. Further, the generating of the at least one user data based on the detecting of at least one of the physical state, the physiological state, and the emotional state of the at least one user, incorporates one or more types of data that provide a richer and more accurate understanding of the state of the at least one user. Further, the at least one user data comprises at least one sensor data generated by the at least one sensor based on the detecting of at least one of the physical state, the physiological state, and the emotional state of the at least one user and at least one external data generated by the at least one external device comprising at least one wearable sensor, an IoT device, and a health monitoring system. Further, the at least one data may include the at least one sensor data and the at least one external data forming an integrated data. Further, the integrated data may be used for dynamically adjusting the at least one output of the at least one language model. Further, a real time feedback may be provided to the at least one user based on a combined analysis of the at least one sensor data and the at least one external data.

FIG. 5 is a flowchart of a method 500 for facilitating customizable communications with users, in accordance with some embodiments. Accordingly, at 502, the method 500 may include analyzing, using the processing device, the at least one output based on at least one criterion. Further, the at least one criterion may correspond to at least one predefined operational boundary for the at least one output. Further, the at least one criterion may include a compliance of the at least one output with HIPAA, GDPR, PIPEDA, and other data protection standards.

Further, the at Further, at 504, the method 500 may include determining, using the processing device, an appropriacy of the at least one output for the at least one user based on the analyzing of the at least one output. Further, the appropriacy may include a positive appropriacy and a negative appropriacy. Further, the transmitting of the at least one output may be based on the positive appropriacy of the at least one output. Further, the determining of the appropriacy of the at least one output for the at least one user and the transmitting of the at least one output based on the positive appropriacy of the at least one output describes quality controlling of the at least one output for ensuring at least one of a relevance and an appropriacy of the at least one output, which is crucial in the facilitating of the customizable communications. Further, at least one of a communication mode and a natural language may be identified for the at least one user based on the at least one criterion. Further, the at least one of the communication mode and the natural language may correspond to at least one preference of the at least one user. Further, at least one of the plurality of instructions may be adapted to align to the at least one preference of the at least one user, and at least one capability (such as a type of output device, a type of input device, a network bandwidth, etc.) of the at least one user device. Further, a continuous learning may be performed for at least one interaction (communication) of the at least one user for refining and personalizing a future communication with the at least one user.

FIG. 6 is a flowchart of a method 600 for facilitating customizable communications with users, in accordance with some embodiments. Accordingly, at 602, the method 600 may include identifying, using the processing device, at least one first instruction from the plurality of instructions based on the negative appropriacy. Further, at 604, the method 600 may include obtaining, using the processing device, at least one modified output using the at least one language model based on the at least one input and the at least one first instruction. Further, at 606, the method 600 may include transmitting, using the communication device, the at least one modified output to the at least one user device. Further, the obtaining of the at least one modified output from the at least one language model if the at least one output obtained from the at least one language model has the negative appropriacy improves user's satisfaction and the relevance of the communications.

FIG. 7 is a flowchart of a method 700 for facilitating customizable communications with users, in accordance with some embodiments. Accordingly, at 702, the method 700 may include receiving, using the communication device, at least one feedback for at least one previous output corresponding to at least one previous input from the at least one user device. Further, at 704, the method 700 may include updating, using the processing device, at least one of a plurality of previous instructions based on the at least one feedback. Further, at 706, the method 700 may include determining, using the processing device, at least one of the plurality of instructions based on the updating. Further, the identifying of the at least one instruction from the plurality of instructions may be based on the determining of at least one of the plurality of instructions. Further, the updating of at least one of the plurality of previous instructions based on the at least one feedback for the at least one previous output to determine at least one of the plurality of instructions may make the plurality of instructions more relevant, responsive, and intelligent. Further, in an embodiment, the at least one feedback may include a real time feedback. Further, the updating of at least one of the plurality of previous instructions may include dynamically updating and adapting at least one of the plurality of previous instructions based on the real time feedback, the at least one input, and the at least one output.

Further, in some embodiments, the method 700 may include obtaining, using the processing device, at least one additional information associated with at least one of the plurality of previous instructions. Further, the updating of at least one of the plurality of instructions may be based on the at least one additional information. Further, the at least on additional information may include an information from a subject matter expert, an information from at least one of a policy, a regulation, a rule, and a law, etc. Further, the updating of at least one of the plurality of instructions may be based on the at least one additional information describing a continuous improvement loop through the at least one additional information, which ensures that the plurality of instructions stays current and effective.

FIG. 8 is a flowchart of a method 800 for facilitating customizable communications with users, in accordance with some embodiments. Accordingly, at 802, the method 800 may include analyzing, using the processing device, the at least one instruction. Further, at 804, the method 800 may include identifying, using the processing device, at least one portion of at least one data based on the analyzing of the at least one instruction. Further, the at least one data may be associated with the at least one user. Further, the at least one data may include a health record of the at least one user. Further, the at least one language model may be configured for accessing the at least one portion of the at least one data based on the identifying. Further, the generating of the at least one output may be based on the accessing of the at least one portion of the at least one data. Further, the generating of the at least one output based on the accessing of the at least one portion of the at least one data which is identified based on the at least one instruction describes at least one of a controlled and a restricted access of the at least one data to ensure a privacy of the at least one user. Further, the accessing of the at least one portion of the at least one data maintain the confidentiality of the at least one user and complying with HIPAA, GDPR, PIPEDA, and other data protection standards and may be guided by the at least one instruction. Further, the accessing of the at least one portion of the at least one data demonstrates an advanced data handling technique.

Figure 9:
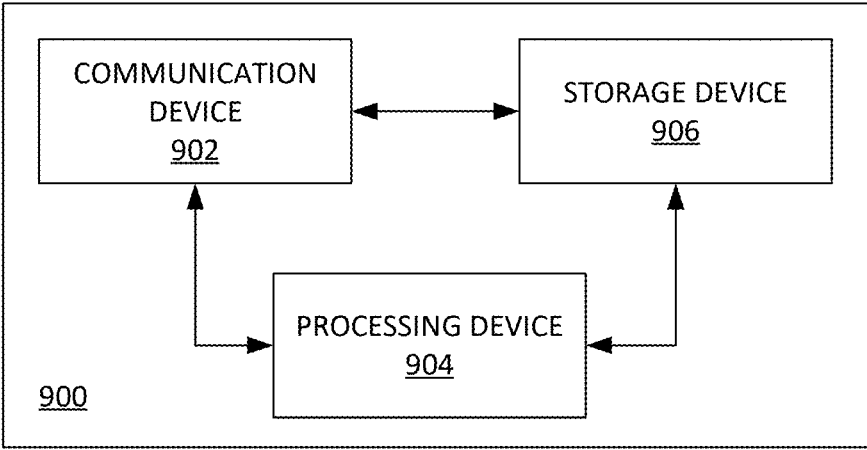
FIG. 9 is a block diagram of a system 900 for facilitating customizable communications with users, in accordance with some embodiments.
Figure 11:
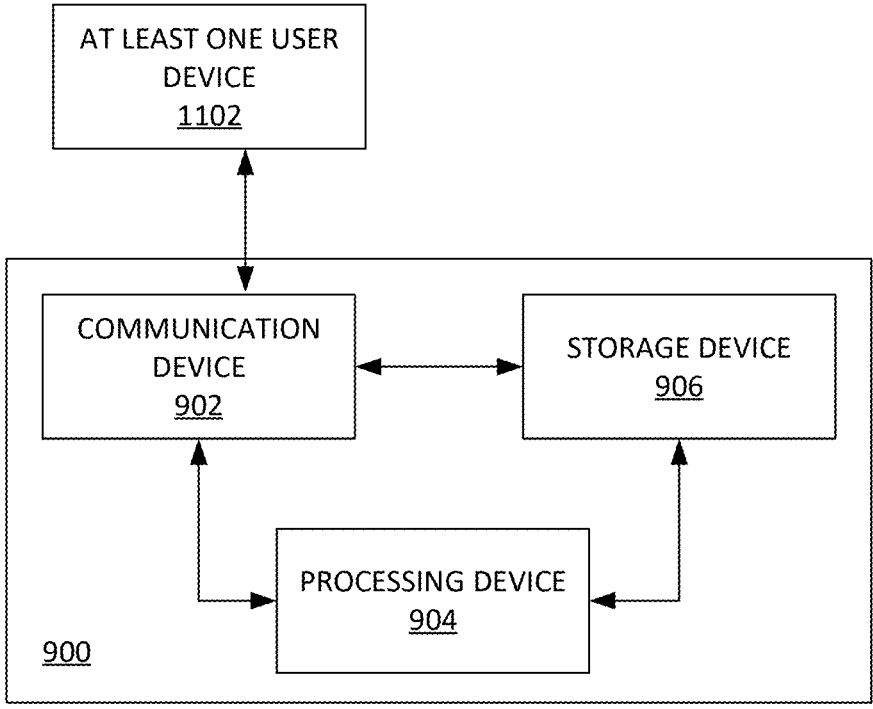
FIG. 11 is a block diagram of the system 900 for facilitating customizable communications with users, in accordance with some embodiments.

FIG. 9 is a block diagram of a system 900 for facilitating customizable communications with users, in accordance with some embodiments. Further, the system 900 may be an artificial intelligence (AI)-based system. Further, the system 900 may be a customizable communication system. Further, the system 900 may include a communication device 902 configured for receiving at least one input associated with at least one user from at least one user device 1102 (as shown in FIG. 11) associated with the at least one user. Further, the communication device 902 may be configured for transmitting at least one output to the at least one user device 1102.

Further, the system 900 may include a processing device 904 communicatively coupled with the communication device 902. Further, the processing device 904 may be configured for analyzing the at least one input. Further, the processing device 904 may be configured for identifying at least one instruction from a plurality of instructions based on the analyzing of the at least one input. Further, the processing device 904 may be configured for obtaining the at least one output using at least one language model based on the at least one input and the at least one instruction. Further, the obtaining of the at least one output may include determining at least one value to at least one parameter associated with the at least one language model based on the at least one instruction. Further, the obtaining of the at least one output may include inputting the at least one input to the at least one language model based on the determining. Further, the at least one language model may be configured for generating the at least one output based on the at least one value of the at least one parameter and the at least one input.

Further, the system 900 may include a storage device 906 communicatively coupled with the processing device 904. Further, the storage device 906 may be configured for storing the at least one input and the at least one output.

Further, in some embodiments, the analyzing of the at least one input may include analyzing the at least one input using at least one machine learning model. Further, the at least one machine model may be configured for classifying at least one of a state and an intent for the at least one user based on the at least one input. Further, the identifying of the at least one instruction may be based on at least one of the state and the intent.

Further, in some embodiments, the analyzing of the at least one input may include analyzing the at least one input using at least one machine learning model. Further, the at least one machine learning model may be configured for predicting at least one requirement of the at least one user. Further, the identifying of the at least one instruction may be based on the at least one requirement.

Further, in some embodiments, the processing device 904 may be configured for obtaining at least one previous input of the at least one user. Further, the processing device 904 may be configured for analyzing the at least one previous input. Further, the processing device 904 may be configured for determining at least one value for at least one variable based on the analyzing of the at least one previous input and the analyzing of the at least one input. Further, the identifying of the at least one instruction may be based on the at least one value of the at least one variable.

Figure 10:
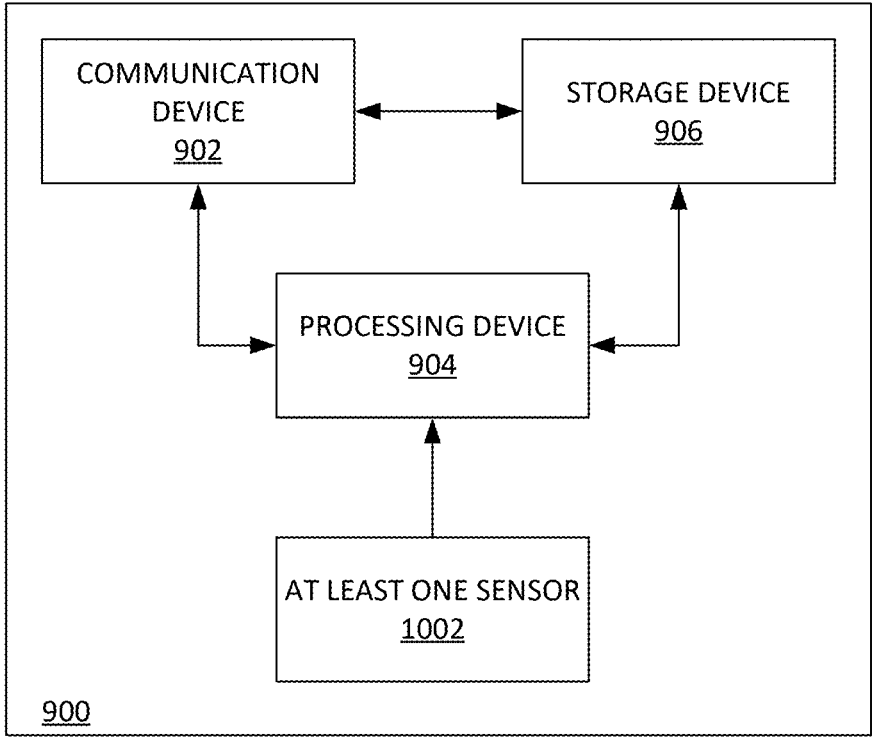
FIG. 10 is a block diagram of the system 900 for facilitating customizable communications with users, in accordance with some embodiments.

In further embodiments, the system 900 may include at least one sensor 1002 (as shown in FIG. 10) communicatively coupled with the processing device 904. Further, the at least one sensor 1002 may be configured for detecting at least one of a physical state, a physiological state, and an emotional state of the at least one user. Further, the processing device 904 may be configured for generating at least one user data associated with the at least one user based on the detecting. Further, the processing device 904 may be configured for analyzing the at least one user data. Further, the identifying of the at least one instruction may be based on the analyzing of the at least one user data.

Further, in some embodiments, the processing device 904 may be configured for analyzing the at least one output based on at least one criterion. Further, the processing device 904 may be configured for determining an appropriacy of the at least one output for the at least one user based on the analyzing of the at least one output. Further, the appropriacy may include a positive appropriacy and a negative appropriacy. Further, the transmitting of the at least one output may be based on the positive appropriacy of the at least one output.

Further, in some embodiments, the processing device 904 may be configured for identifying at least one first instruction from the plurality of instructions based on the negative appropriacy. Further, the processing device 904 may be configured for obtaining at least one modified output using the at least one language model based on the at least one input and the at least one first instruction. Further, the communication device 902 may be configured for transmitting the at least one modified output to the at least one user device 1102.

Further, in some embodiments, the communication device 902 may be configured for receiving at least one feedback for at least one previous output corresponding to at least one previous input from the at least one user device 1102. Further, the processing device 904 may be configured for updating at least one of a plurality of previous instructions based on the at least one feedback. Further, the processing device 904 may be configured for determining at least one of the plurality of instructions based on the updating. Further, the identifying of the at least one instruction from the plurality of instructions may be based on the determining of at least one of the plurality of instructions.

Further, in some embodiments, the processing device 904 may be configured for obtaining at least one additional information associated with at least one of the plurality of previous instructions. Further, the updating of at least one of the plurality of instructions may be based on the at least one additional information.

Further, in some embodiments, the processing device 904 may be configured for analyzing the at least one instruction.

Further, the processing device 904 may be configured for identifying at least one portion of at least one data based on the analyzing of the at least one instruction. Further, the at least one language model may be configured for accessing the at least one portion of the at least one data based on the identifying. Further, the generating of the at least one output may be based on the accessing of the at least one portion of the at least one data.

FIG. 10 is a block diagram of the system 900 for facilitating customizable communications with users, in accordance with some embodiments.

FIG. 11 is a block diagram of the system 900 for facilitating customizable communications with users, in accordance with some embodiments.

FIG. 12 is a flow chart of a method 1200 for facilitating hybrid use of scripted dialog and generative AI models in well-being of an individual, in accordance with some embodiments. Accordingly, at 1202, the method 1200 may include receiving, using a communication device, at least one query from at least one user device associated with at least one user. Further, the at least one query may be associated with personal assistance, mental well-being assistance, life coaching, customer service, healthcare, etc., for the at least one user. Further, the at least one user may include an individual, an institution, and an organization that may need assistance for mental well-being assistance, life coaching, and healthcare. Further, the at least one user device may include a smartphone, a tablet, a laptop, a smartphone, a desktop, etc.

Further, at 1204, the method 1200 may include analyzing, using a processing device, the at least one query.

Further, at 1206, the method 1200 may include selecting, using the processing device, a Scripted Dialog Instructions (SDI) module from a plurality of SDI modules based on the analyzing.

Further, at 1208, the method 1200 may include generating, using the processing device, a response corresponding to the at least one query using at least one generative AI model (GM). Further, the SDI module may guide the at least one GM to generate the response.

Further, at 1210, the method 1200 may include determining, using the processing device, a credibility score associated with the response.

Further, at 1212, the method 1200 may include transmitting, using the communication device, the credibility score and the response to the at least one user device.

Further, at 1214, the method 1200 may include storing, using a storage device, the credibility score, the at least one query, and the response.

Further, the credibility score, on a scale from 0 to 1, may be a vital component of the disclosed AI-based system designed to facilitate the hybrid use of scripted dialog and generative AI models in wellbeing applications. Further, the credibility score may be generated based on the quality, reliability, and contextual appropriateness of the AI model's responses. Importantly, the credibility score acts as a gauge to assess the reliability of the AI's output against the information within its knowledge corpus, including its ability to refrain from referencing outdated or irrelevant clinical data. Further, the credibility score also serves as a crucial measure to determine if the AI model is hallucinating or providing erroneous data. Depending on the credibility score, the system may be instructed to adhere more strictly to the scripted dialog instructions, minimizing the risk of misinformation.

Furthermore, the credibility score may be instrumental in determining which information can be displayed to specific users based on their individual attributes, such as age or history, helping to ensure the delivered information is both relevant and appropriate. Further, the credibility score may further instrumental in determining the validity and reliability of data for further processing (e.g. using a diagnostic algorithm), and the system may decide to further explore or more directly obtain an updated value for information below a credibility threshold. Further, the credibility score may be generated with another large language model (LLM) using reflection which may improve the reliability.

Additional key functionalities of the credibility score within the system include:

Flexibility: Unlike static scripts or hard-coded rules, the credibility score enables more dynamic and personalized interactions while ensuring the responses are reliable and safe.

Adaptability: The score assists the system in selecting the most suitable instruction set or module from a plurality of options, based on the user's state or intent.

Context-Awareness: The score aids in tailoring the AI's output to the context, enabling it to adopt specific personas, avoid sensitive topics, or utilize specific knowledge sets.

Supervised Learning and Feedback Loop: The credibility score informs ongoing updates to the instruction sets based on user feedback, new knowledge, or changing regulations, enhancing the AI model's performance over time.

Safety Measures: Integrated risk management mechanisms monitor the AI's output based on the credibility score, ensuring the responses remain within defined operational boundaries and minimizing the risks of misinformation or inappropriate responses.

In summary, the credibility score is an essential aspect of the system, fostering adaptable, contextually aware, and safer interactions between the AI model and the user.

Further, in some embodiments, the method 1200 may include comparing, using the processing device, the credibility score with a threshold score. Further, the method 1200 may include generating, using the processing device, an alert based on the comparing. Further, the transmitting of the credibility score and the response may be based on the alert. Further, in an instance, the response and the credibility score may be transmitted if the credibility score is more than the threshold score. Further, in an instance, the alert may indicate that the credibility score is less than the threshold score and the response won't be transmitted.

Figure 13:
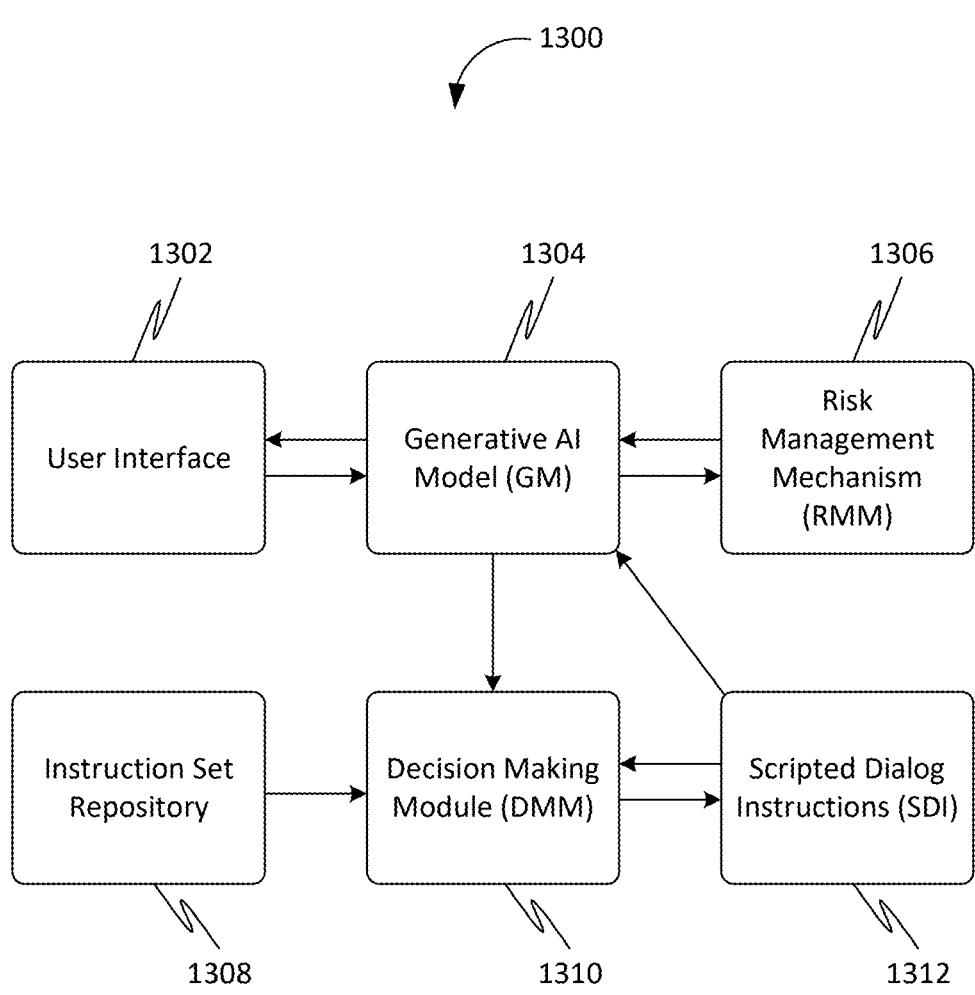
FIG. 13 is a block diagram of a system 1300 for facilitating hybrid use of scripted dialog and generative AI models in well-being of an individual, in accordance with some embodiments.

FIG. 13 is a block diagram of a system 1300 for facilitating hybrid use of scripted dialog and generative AI models in well-being of an individual, in accordance with some embodiments. Accordingly, the system 1300 may be associated with components that may include a user interface (UI) 1302, a Generative AI Model (GM) 1304, Scripted Dialog Instructions (SDIs) 1312, an Instruction Set Repository 1308, a Decision Making Module (DMM) 1310, and a Risk Management Mechanism (RMM) 1306. Further, the user interface (UI) 1302 represents the interface through which users interact with the system 1300. Further, the user interface 1302 may include a web browser, mobile app, or any other means of interaction. Further, an arrow may be drawn from the user interface 1302 to the GM 1304 to show the direction of user input. Similarly, an arrow may be drawn from the GM 1304 to the user interface 1302 to depict the system 1300 response.

Further, an arrow may be drawn from the GM 1304 to the RMM 1306, showing how the GM's generated responses are monitored. Then, another arrow from the RMM 1306 box back to the GM 1304 to depict the system's corrective action when a risk is detected.

Further, below the GM 1304 and RMM 1306, an arrow may be drawn from the SDIs 1312 to the GM 1304 to represent how these instructions guide the GM's responses.

Further, an arrow may be drawn from DMM 1310 to SDIs 1312, indicating the decision-making module's role in selecting the appropriate SDI. Further, an arrow may be drawn from SDIs 1312 to the DMM 1310, illustrating the SDI's influence on the DMM's subsequent decision making.

Further, the Instruction Set Repository 1308 represents the database that stores the different sets of SDIs 1312. Further, an arrow may be drawn from the repository 1308 to the DMM 1310 to show how the appropriate instruction set is selected based on the context.

Figure 14:
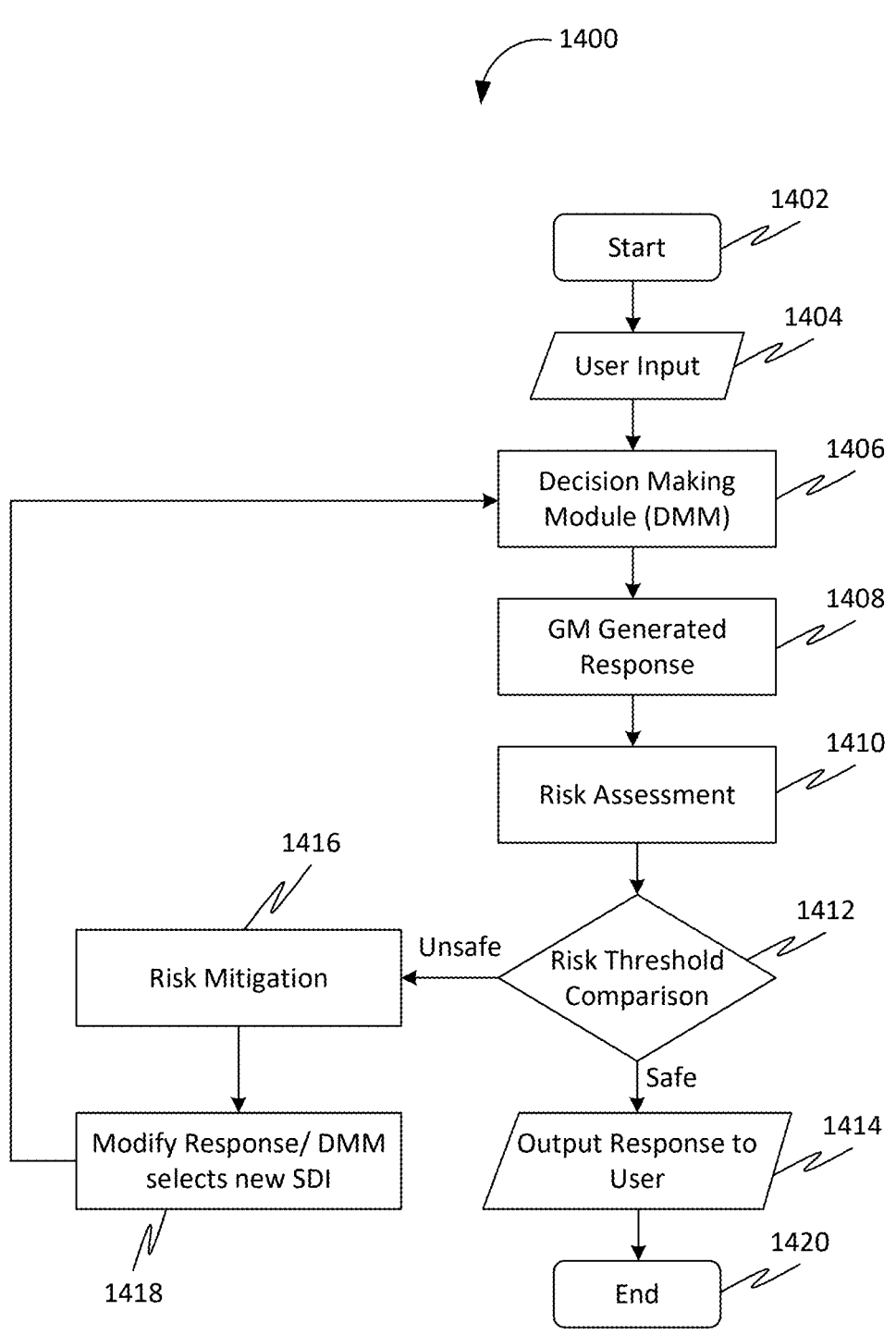
FIG. 14 is a flow diagram of a method 1400 for facilitating hybrid use of scripted dialog and generative AI models in well-being of an individual, in accordance with some embodiments.

FIG. 14 is a flow diagram of a method 1400 for facilitating hybrid use of scripted dialog and generative AI models in well-being of an individual, in accordance with some embodiments. Accordingly, FIG. 14 represents the steps a user takes to interact with the system. Further, the method 1400 starts with the user entering a query or the system generating a query responded by the user, and progressing through the system consulting the SDIs, generating a response, and presenting this response to the user.

Further, at 1402, the method 1400 may include a starting step.

Further, at 1404, the method 1400 may include receiving initial inputs given by the user. Below the "User Input," a box "Decision-Making Module (DMM)" 1406 may be present. This represents the initial process by the DMM based on the selected Scripted Dialog Instructions (SDI).

Further, at 1408, the method 1400 may include generating an initial response by GM. Further, at 1410, the method 1400 may include an initial risk assessment of the generated response.

Further, at 1412, the method 1400 may include comparing the assessed risk with a predetermined risk threshold.

If the risk is below the threshold ("Safe"), the method 1400 may include signifying the response as safe to output to the user. If the risk is above the threshold ("Unsafe"), the method 1400 may include taking action to reduce the risk associated with the response.

Further, at 1416, the method 1400 may include risk mitigation. Further, at 1418, the method 1400 may include either modifying the existing response or the DMM selecting a new SDI for generating a different response. Further, the method 1400 may include the DMM generating a new decision based on the modifications or new SDI.

Further, at 1414, the method 1400 may include sending a response to the user.

Further, at 1420, the method 1400 may include an ending step of the process when a safe response is outputted.

Figure 15:
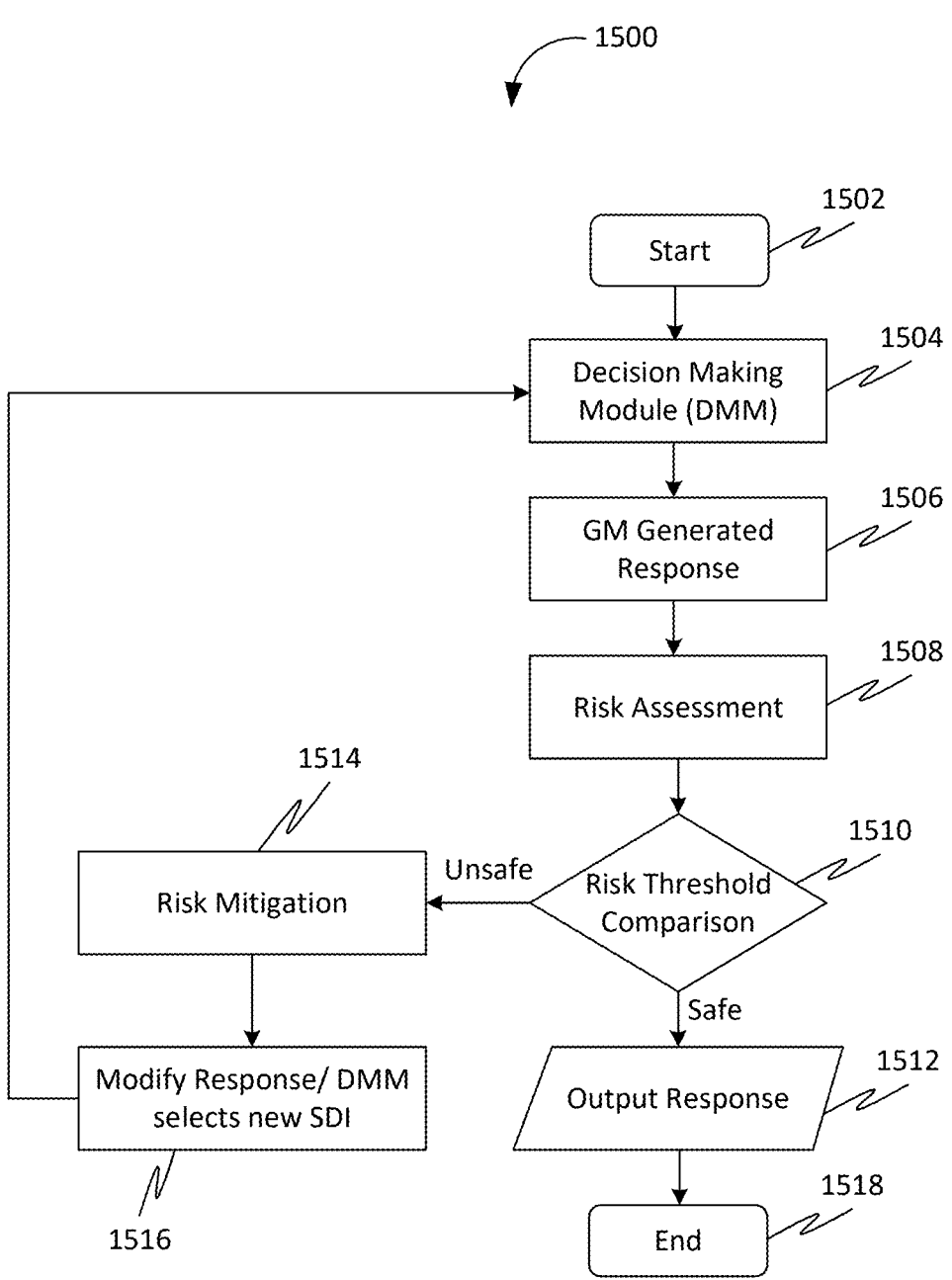
FIG. 15 is a flow diagram of a method 1500 for facilitating hybrid use of scripted dialog and generative AI models in well-being of an individual, in accordance with some embodiments.

FIG. 15 is a flow diagram of a method 1500 for facilitating hybrid use of scripted dialog and generative AI models in well-being of an individual, in accordance with some embodiments. Accordingly, FIG. 15 highlights how the system is capable of detecting potential risks and responding accordingly. This is depicted as a decision tree or flowchart showing how the system decides whether to generate an alert or stop itself based on the potential risks associated with a given response.

Further, at 1502, the method 1500 may include a starting step. Further, at 1504, the method 1500 may include a process performed by decision making module based on the selected Scripted Dialog Instructions (SDI).

Further, at 1506, the method 1500 may include generating an initial response by GM. Further, at 1508, the method 1500 may include an initial risk assessment of the generated response.

Further, at 1510, the method 1500 may include comparing the assessed risk with a predetermined risk threshold.

If the risk is below the threshold ("Safe"), the method 1500 may include signifying the response as safe to output to the user. Further, at 1512, the method 1500 may include outputting the response to the user.

If the risk is above the threshold ("Unsafe"), the method 1500 may include taking action to reduce the risk associated with the response.

Further, at 1514, the method 1500 may include risk mitigation. Further, at 1516, the method 1500 may include either modifying the existing response or the DMM selecting a new SDI for generating a different response. Further, the method 1500 may proceed to perform the process by the DMM.

Further, at 1518, the method 1500 may include an ending step.

Figure 16:
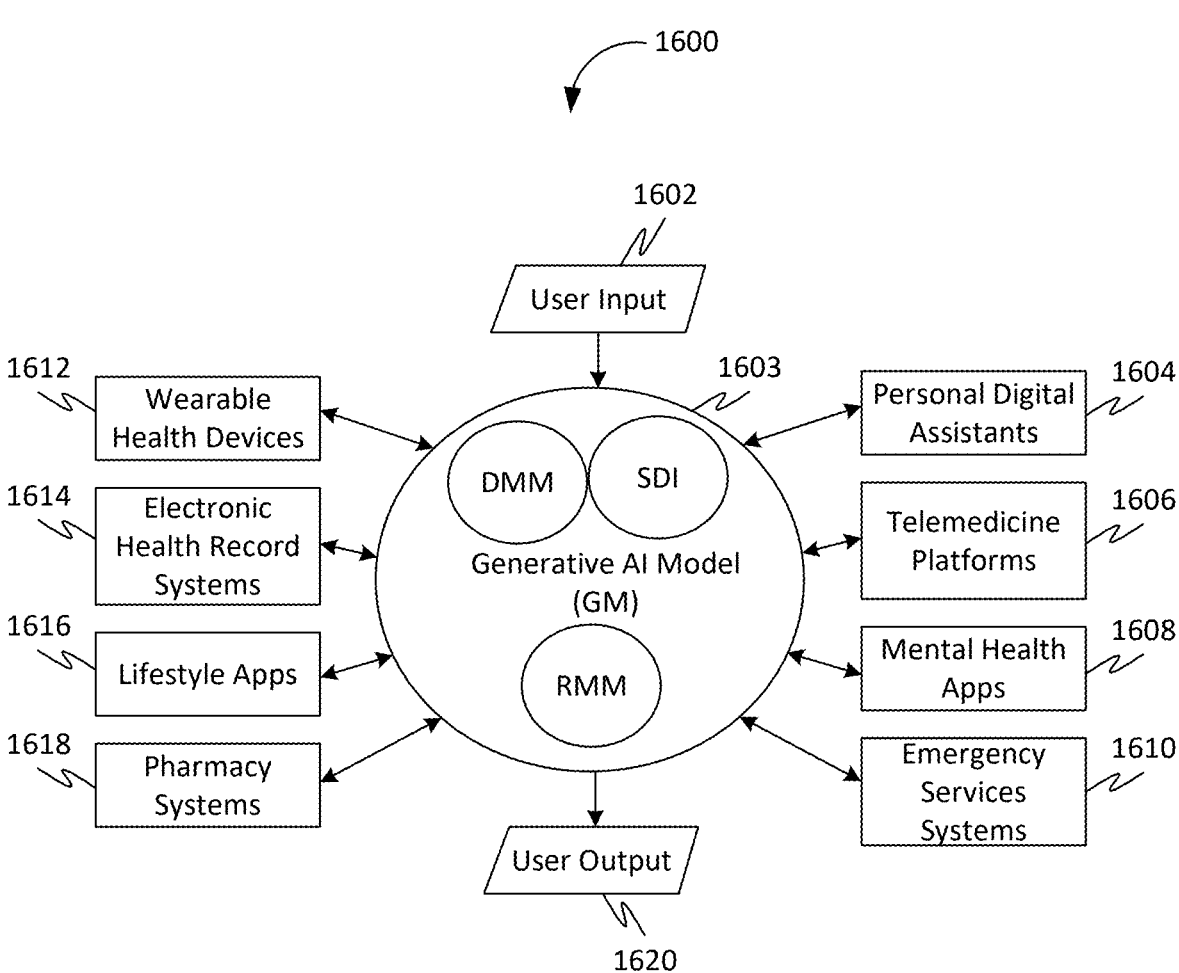
FIG. 16 illustrates a system 1600 integrated with external systems and devices for facilitating hybrid use of scripted dialog and generative AI models in well-being of an individual, in accordance with some embodiments.

FIG. 16 illustrates a system 1600 integrated with external systems and devices for facilitating hybrid use of scripted dialog and generative AI models in well-being of an individual, in accordance with some embodiments. Further, the system 1600 may be connected to the external devices like wearables and other software systems. FIG. 16 demonstrates how data from these sources can be incorporated into the user's interaction with the system 1600.

Further, the system 1600 may be configured for facilitating interaction between a user and a Generative AI Model (GM) 1603. Further, the GM 1603 may include a DMM, a SDI, and a RMM. Further, the system 1600 may be associated with a user feedback symbolizing the feedback given by the user based on their interaction with the GM 1603. Further, the system 1600 may be configured for analysis of feedback and performance. Further, the system 1600 may be associated with developers, medical professionals, or AI specialists that may identify potential improvements based on the analysis. Further, the system 1600 may be configured for integrating improvements and adjustments. Further, the system 1600 may be based on an iterative process that may be a constant cycle of improvement.

Further, the system 1600 may receive user inputs 1602. Further, the GM 1603 may be associated with wearable health devices 1612, electronic health record systems 1614, lifestyle apps 1616, pharmacy systems 1618, personal digital assistants 1604, telemedicine platforms 1606, mental health apps 1608, emergency services systems 1610, etc. Further, the system 1600 may be configured for generating a user output 1620.

Figure 17:
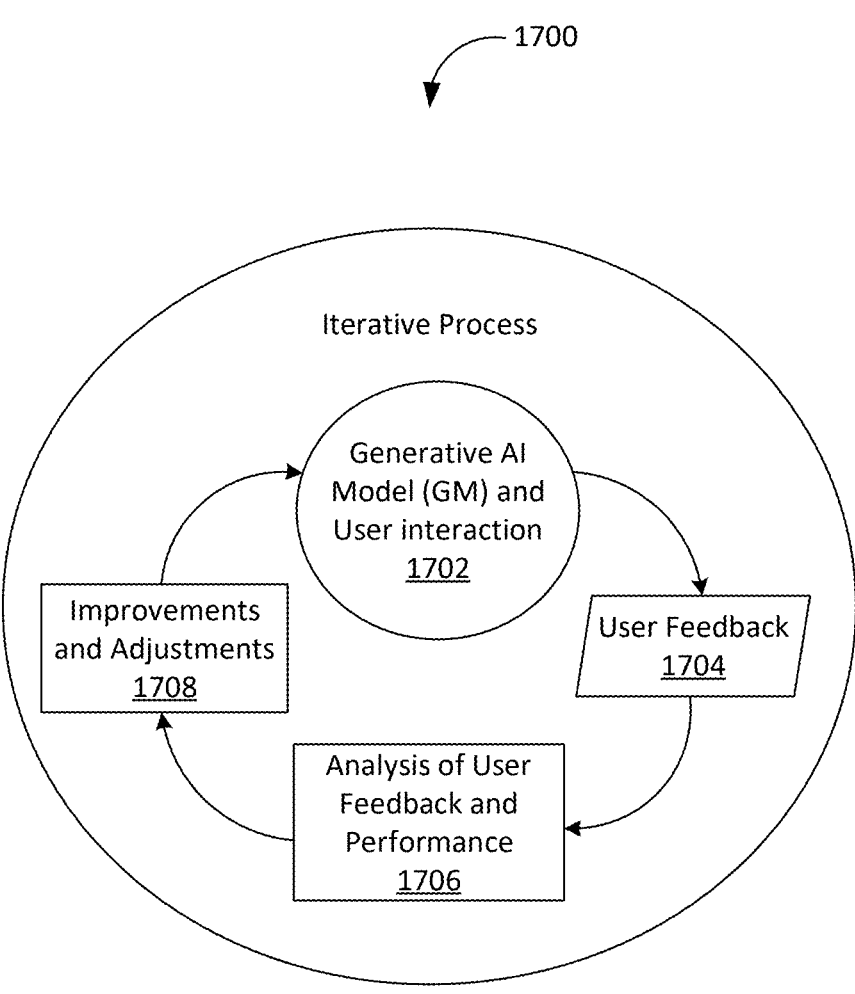
FIG. 17 illustrates a method 1700 for a learning loop associated with the system for facilitating hybrid use of scripted dialog and generative AI models in well-being of an individual, in accordance with some embodiments.

FIG. 17 illustrates a method 1700 for a learning loop associated with the system for facilitating hybrid use of scripted dialog and generative AI models in well-being of an individual, in accordance with some embodiments. FIG. 17 illustrates how user feedback and interaction data are incorporated into the Instruction Set Repository to continually improve and refine the SDIs. Further, at 1702, the method 1700 may include interaction between a user and the generative AI model. Further, at 1704, the method 1700 may include receiving a user feedback. Further, at 1706, the method 1700 may include analyzing the user feedback and performance. Further, at 1708, the method 1700 may include making improvements and adjustments.

Figure 18:
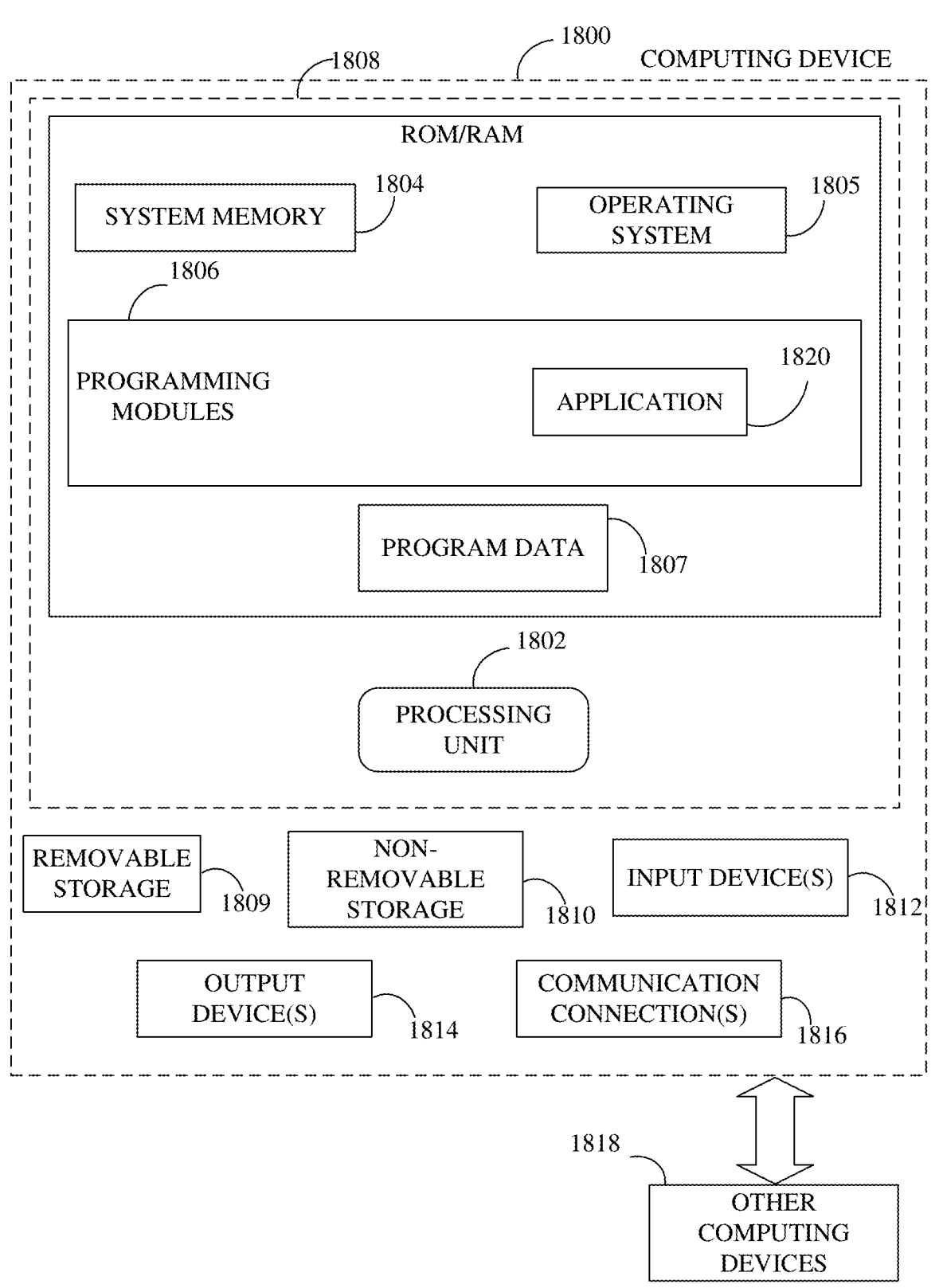
FIG. 18 is a block diagram of a computing device for implementing the methods disclosed herein, in accordance with some embodiments.

With reference to FIG. 18, a system consistent with an embodiment of the disclosure may include a computing device or cloud service, such as computing device 1800. In a basic configuration, computing device 1800 may include at least one processing unit 1802 and a system memory 1804. Depending on the configuration and type of computing device, system memory 1804 may comprise, but is not limited to, volatile (e.g. random-access memory (RAM)), non-volatile (e.g. read-only memory (ROM)), flash memory, or any combination. System memory 1804 may include operating system 1805, one or more programming modules 1806, and may include a program data 1807. Operating system 1805, for example, may be suitable for controlling computing device 1800's operation. In one embodiment, programming modules 1806 may include image-processing module, machine learning module. Furthermore, embodiments of the disclosure may be practiced in conjunction with a graphics library, other operating systems, or any other application program and is not limited to any particular application or system. This basic configuration is illustrated in FIG. 18 by those components within a dashed line 1808.

Computing device 1800 may have additional features or functionality. For example, computing device 1800 may also include additional data storage devices (removable and/or non-removable) such as, for example, magnetic disks, optical disks, or tape. Such additional storage is illustrated in FIG. 18 by a removable storage 1809 and a non-removable storage 1810. Computer storage media may include volatile and non-volatile, removable and non-removable media implemented in any method or technology for storage of information, such as computer-readable instructions, data structures, program modules, or other data. System memory 1804, removable storage 1809, and non-removable storage 1810 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1800. Any such computer storage media may be part of device 1800. Computing device 1800 may also have input device(s) 1812 such as a keyboard, a mouse, a pen, a sound input device, a touch input device, a location sensor, a camera, a biometric sensor, etc. Output device(s) 1814 such as a display, speakers, a printer, etc. may also be included. The aforementioned devices are examples and others may be used.

Computing device 1800 may also contain a communication connection 1816 that may allow device 1800 to communicate with other computing devices 1818, such as over a network in a distributed computing environment, for example, an intranet or the Internet. Communication connection 1816 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1804, including operating system 1805. While executing on processing unit 1802, programming modules 1806 (e.g., application 1820 such as a media player) may perform processes including, for example, one or more stages of methods, algorithms, systems, applications, servers, databases as described above. The aforementioned process is an example, and processing unit 1802 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Furthermore, embodiments of the disclosure may be practiced in a virtual computer comprising virtual computer components. Further, the virtual computer components may include a processor, a memory, etc.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

ASPECTS

1. An artificial intelligence (AI)-based system for user interaction, wherein the system comprises both a generative AI model (GM) and a meta layer of scripted instructions provided by one or more individuals with relevant expertise.

2. The AI-based system of aspect 1, wherein the scripted instructions include directives for the GM to adopt specific personas, undertake tasks, or suppress or reveal certain information.

3. The AI-based system of aspect 1, wherein the scripted instructions can be updated over time based on new knowledge, user feedback, or changes in guidelines and policies, and these updates do not necessarily require complete retraining of the GM.

4. The AI-based system of aspect 1, wherein the GM follows the scripted instructions while generating detailed responses based on its underlying language model.

5. The AI-based system of aspect 1, wherein the GM can switch between different modules or scripted instructions based on user interactions and emotional state.

6. The AI-based system of aspect 1, wherein the GM is used in a healthcare setting for tasks such as patient interviews, patient monitoring, therapy sessions, and mindfulness exercises.

7. The AI-based system of aspect 1, wherein the GM is used in personal assistance scenarios, providing user-specific responses based on the scripted instructions.

8. The AI-based system of aspect 1, wherein the GM is used in life coaching and mental well-being scenarios, facilitating conversations and activities according to the scripted instructions.

9. The AI-based system of aspect 1, wherein the system can integrate with other wearables and systems for improved functionality.

10. The AI-based system of aspect 1, wherein the system can selectively respond with region-specific information based on the location of the user or a specific directive in the scripted instructions.

11. The AI-based system of aspect 1, wherein the GM can suppress outdated or incorrect information it was initially trained on, under the direction of the scripted instructions.

12. The AI-based system of aspect 1, wherein the scripted instructions can include specific directives to handle sensitive or ethical topics, ensuring safe and appropriate user interactions.

13. The AI-based system of aspect 1, wherein the GM is designed to handle potential hallucinations or misinformation through the use of the meta layer of scripted instructions, thereby enhancing the accuracy of the responses.

14. The AI-based system of aspect 1, wherein the GM is instructed by the Scripted Dialog Instructions to adapt to the user's language and literacy level, creating a personalized and accessible user interaction.

15. The AI-based system of aspect 1, wherein the scripted instructions can be adapted for application in different domains outside healthcare, such as customer service, education, entertainment, etc. while maintaining the unique features of controlled GM interaction.

16. The AI-based system of aspect 1, wherein the system's adaptability to different languages and cultural sensitivities, facilitated by the scripted instructions, allows for its global application.

17. The AI-based system of aspect 1, wherein the system's integration with other systems, devices, or data sources (such as electronic health records or wearables) enhances its capacity to provide more personalized and accurate responses.

18. The AI-based system of aspect 1, wherein the system's capacity to remember and learn from past interactions with the user, made possible by the scripted instructions, results in an increasingly tailored user experience.

19. The AI-based system of aspect 1, wherein the system's ability to adapt to changes in the user's mood or emotions during interactions, facilitated by the scripted instructions, allows for a more human-like, empathetic communication.

20. The AI-based system of aspect 1, wherein the system's ability to dynamically adapt to adapt to the user's specific computing device (e.g. smartphone, desktop computer, or Plain Old Telephone Service (POTS) telephone) in, facilitated by the scripted instructions, allows for more effective communications.

21. The AI-based system of aspect 1, wherein the system's ability to dynamically communicate in the preferred language of the user by translating the scripted instructions in real-time, allows for more communication in multiple languages.

22. The AI-based system of aspect 1, wherein the scripted instructions can be updated remotely and dynamically to allow for system improvements without requiring complete retraining of the GM.

23. The AI-based system of aspect 1, wherein the system's ability to maintain the confidentiality of user data, complying with HIPAA, GDPR, PIPEDA, and other data protection standards, is guided by the scripted instructions.

24. The AI-based system of aspect 1, wherein the system can function across multiple platforms and devices, including but not limited to smartphones, tablets, computers, home devices, and in-vehicle systems, facilitating an "anywhere, anytime" accessibility for users, wherein the communication generated by SDI is tailored based on the user's computing device being used to interact, and its capabilities and limitations (e.g. smartphone, desktop computer, Plain Old Telephone Service (POTS) telephone, etc.).

25. The AI-based system of aspect 1, wherein the system's ability to adapt its interaction style according to the user's preferences or needs (e.g., text, voice, visual avatar) is made possible by the scripted instructions.

26. The AI-based system of aspect 1, wherein the system's scripted instructions allow it to integrate with and utilize data from wearable devices and other health monitoring systems for contextually rich and personalized user interactions.

27. The AI-based system of aspect 1, wherein the scripted instructions can guide the system to interact in multiple languages, making it a multilingual interface for broader accessibility.

28. The AI-based system of aspect 1, wherein the scripted instructions guide the system to demonstrate cultural sensitivity during its interactions, increasing its effectiveness and acceptability across diverse user demographics.

29. The AI-based system of aspect 1, wherein the scripted instructions can instruct the system to adjust its level of empathy, compassion, and engagement, depending on the user's emotional state, the task at hand, or other relevant contexts, wherein the system may be further instructed for adapting to user's literacy level and cognitive skills.

30. The AI-based system of aspect 1, wherein the scripted instructions guide the system to maintain a running dialogue history to provide context for ongoing conversations, wherein the system has an ability to selectively sample the conversation history to tailor this context to the exact needs of a particular genAI communication-entire session, particular section, particular dialog, or any combination of specific pieces.

31. The AI-based system of aspect 1, wherein the system can anticipate user requirements based on user behavior patterns, context, and previous interactions.

32. The AI-based system of aspect 1, wherein the system is capable of identifying and managing crisis situations by triggering crisis intervention modules or emergency response procedures.

33. The AI-based system of aspect 1, wherein the system incorporates user feedback for ongoing improvement of its interactions and outcomes.

34. The AI-based system of aspect 1, wherein the system's performance and interaction quality are evaluated through defined metrics, and the system evolves based on these assessments.

35. The AI-based system of aspect 1, wherein the system is capable of conducting health education sessions using scripted instructions.

36. The AI-based system of aspect 1, wherein the system can be instructed to use non-verbal communication cues, such as rich formatting, diagrams, emoticons, animations, or other visual aids, to enhance the quality of interaction.

37. The AI-based system of aspect 1, wherein the system can be instructed to use verbal communication cues to enhance the quality of interaction.

38. The AI-based system of aspect 1, wherein the GM's instructions include a description of what is visible on the user interface, to provide additional context via visual cues that enable it to produce a more accurate response.

39. The AI-based system of aspect 1, wherein the system uses a hybrid interface for combining conversation with graphical controls (hyperlinks, option buttons).

40. The AI-based system of aspect 1, wherein the system integrates with other software applications to enhance its functionality and provide a seamless user experience.

41. The AI-based system of aspect 1, wherein the system can conduct group sessions or multiple individual sessions simultaneously, guided by scripted instructions.

42. The AI-based system of aspect 1, wherein the system can be instructed to provide a comprehensive summary or report of the user interaction for a specified time period.

43. The AI-based system of aspect 1, wherein the system can be instructed to flag important or critical information during its interaction for further action or review.

44. The AI-based system of aspect 1, wherein the system can be guided to provide specialized assistance for various user demographics, such as seniors, children, people with disabilities, etc.

45. The AI-based system of aspect 1, wherein the system can interact with the user in a variety of settings, such as at home, in a healthcare facility, during transit, at work, or during leisure activities.

46. The AI-based system of aspect 1, wherein the system is capable of detecting the user's emotional state and adjusting its interaction accordingly.

47. The AI-based system of aspect 1, wherein the system is capable of conducting routine check-ins with the user as per the guidance received from scripted instructions.

48. The AI-based system of aspect 1, wherein the system is capable of providing assistance and resources to users for crisis management or immediate relief.

49. The AI-based system of aspect 1, wherein the system can be instructed to behave as a companion, providing comfort, engagement, and mental stimulation to the user.

50. The AI-based system of aspect 1, wherein the system can be instructed to provide relaxation techniques, guided meditation, or other stress management methods.

51. The AI-based system of aspect 1, wherein the system is capable of incorporating user-specific preferences and personalizing its interactions accordingly.

52. The AI-based system of aspect 1, wherein the system is capable of self-auditing its interactions and identifying areas of improvement.

53. The AI-based system of aspect 1, wherein the system can be instructed to conduct cognitive and behavioral assessments as per the guidance received from scripted instructions.

54. The AI-based system of aspect 1, wherein the system can be guided to perform behavioral health therapies or psychotherapies such as Cognitive Behavioral Therapy (CBT), Dialectical Behavioral Therapy (DBT), etc.

55. The AI-based system of aspect 1, wherein the system can be instructed to conduct an analysis of user's speech, text, or other interaction data to gain insights into the user's mental state, emotional state, or health condition.

56. The AI-based system of aspect 1, wherein the system can integrate with other digital health tools like Electronic Health Records (EHR), Telemedicine platforms, Digital Therapeutics, etc., to provide a comprehensive healthcare solution.

57. The AI-based system of aspect 1, wherein the system can be instructed to maintain data privacy and confidentiality in all its interactions as per the guidance received from scripted instructions.

58. The AI-based system of aspect 1, wherein the system can be instructed to provide support and assistance for a variety of mental health conditions as per the guidance received from scripted instructions.

59. The AI-based system of aspect 1, wherein the system is capable of engaging with users using a variety of communication channels-text, voice, video, etc.

60. The AI-based system of aspect 1, wherein the system can facilitate communication between the user and healthcare professionals or other individuals, as per the guidance received from scripted instructions.

61. The AI-based system of aspect 1, wherein the system can provide reminders for medication, appointments, or other tasks as per the guidance received from scripted instructions.

62. The AI-based system of aspect 1, wherein the system can provide real-time analytics and insights to healthcare providers or other authorized individuals about the user's health condition, progress, or needs.

63. The AI-based system of aspect 1, wherein the system can be instructed to adopt a variety of personas to better engage with different user demographics or to better fulfill specific tasks.

64. The AI-based system of aspect 1, wherein the system can facilitate patient engagement and adherence to treatment plans or health regimens as per the guidance received from scripted instructions.

65. The AI-based system of aspect 1, wherein the system can be instructed to provide interventions for lifestyle modifications or behavior changes as per the guidance received from scripted instructions.

66. The AI-based system of aspect 1, wherein the system is capable of conducting health risk assessments or other preventive care initiatives as per the guidance received from scripted instructions.

67. The AI-based system of aspect 1, wherein the system can be instructed to interact with multiple users simultaneously while maintaining individual user contexts and personalization.

68. The AI-based system of aspect 1, wherein the system is capable of recognizing user communication patterns and adjusting its language or interaction style for optimal engagement.

69. The AI-based system of aspect 1, wherein the system can be instructed to provide specialized support for chronic disease management as per the guidance received from scripted instructions.

70. The AI-based system of aspect 1, wherein the system can be instructed to encourage health-positive behaviors and discourage health-negative behaviors as per the guidance received from scripted instructions.

71. The AI-based system of aspect 1, wherein the system can integrate with IoT devices and use the data for a more comprehensive and personalized user interaction.

72. The AI-based system of aspect 1, wherein the system can provide support for sleep management, exercise routines, diet plans, and other wellness initiatives as per the guidance received from scripted instructions.

73. The AI-based system of aspect 1, wherein the system can be instructed to offer motivation, encouragement, and positive reinforcement as part of its interactions.

74. The AI-based system of aspect 1, wherein the system can assist in scheduling appointments, connecting with healthcare providers, and facilitating healthcare navigation as per the guidance received from scripted instructions.

75. The AI-based system of aspect 1, wherein the system can be instructed to support healthcare providers in patient management, communication, and care delivery as per the guidance received from scripted instructions.

76. The AI-based system of aspect 1, wherein the system can be instructed to facilitate support groups or community interactions as per the guidance received from scripted instructions.

77. The AI-based system of aspect 1, wherein the system is capable of providing post-treatment follow-up and support as per the guidance received from scripted instructions.

78. The AI-based system of aspect 1, wherein the system can facilitate the sharing of health education and resources as per the guidance received from scripted instructions.

79. The AI-based system of aspect 1, wherein the system can facilitate the tracking and management of healthcare costs, insurance, and other logistical aspects as per the guidance received from scripted instructions.

80. The AI-based system of aspect 1, wherein the system can provide support and assistance for a variety of physical health conditions as per the guidance received from scripted instructions.

81. The AI-based system of aspect 1, wherein the system is capable of detecting user distress signals and responding accordingly as per the guidance received from scripted instructions.

82. The AI-based system of aspect 1, wherein the system can be guided to support the user in coping with grief, loss, trauma, or other emotional challenges as per the guidance received from scripted instructions.

83. The AI-based system of aspect 1, wherein the system is implemented with a risk management mechanism that monitors the GM's output to ensure it remains within defined operational boundaries as per the guidance received from scripted instructions.

84. The AI-based system of aspect 83, wherein the risk management mechanism includes an alert system that is triggered when the system detects that the GM might provide an inappropriate or potentially harmful response.

85. The AI-based system of aspect 1, wherein the scripted instructions are dynamically updated based on real-time data from the interaction with the user.

86. The AI-based system of aspect 1, wherein the GM can be instructed to adapt its communication style based on the user's emotional state, detected through textual analysis of the user's responses.

87. The AI-based system of aspect 1, wherein the GM can be instructed to provide responses adhering to specific privacy regulations and guidelines, varying from one geographic region to another.

88. The AI-based system of aspect 1, wherein the system can integrate with and process data from various external sources, including wearable health devices.

89. The AI-based system of aspect 1, wherein the scripted instructions include guidelines for transitioning the GM from one module to another based on the user's responses.

90. The AI-based system of aspect 1, further comprising training the GM to utilize new information without complete retraining.

91. The AI-based system of aspect 1, wherein the GM provides personalized feedback to users based on their history of interactions with the system.

92. The AI-based system of aspect 1, wherein the GM transitions between different modules based on user input or other identified triggers.

93. The AI-based system of aspect 1, further comprising integration of the system with various healthcare systems for seamless exchange of user health data.

94. The AI-based system of aspect 1, wherein the system is capable of handling multilingual interactions or adapting to the language and communication style of the user.

95. The AI-based system of aspect 59, wherein the system's ability to handle multilingual interactions includes translating user input and system responses between different languages.

96. The AI-based system of aspect 1, wherein the GM adapts to the communication style of the user by mimicking the user's language style and complexity in its responses.

97. The AI-based system of aspect 1, wherein the GM adapts its communication style based on the user's health status or emotional state.

98. The AI-based system of aspect 1, further comprising a mechanism for transferring user data between different modules to ensure continuity of interaction.

99. The AI-based system of aspect 1, wherein the integration with various healthcare systems includes synchronization of user health data across different platforms.

100. The AI-based system of aspect 1, wherein the GM's interaction with the user includes promoting health-positive behaviors based on personalized health data.

101. The AI-based system of aspect 1, further comprising instructing the GM to identify signs of distress or critical health conditions in user responses and reacting accordingly.

102. The AI-based system of aspect 1, wherein the GM's support includes offering coping strategies for emotional stressors such as grief, trauma, or anxiety, based on scripted instructions.

103. The AI-based system of aspect 1, wherein the GM's interactions are adapted to maintain engagement and support with the user over an extended period of time.

104. The AI-based system of aspect 1, further comprising a mechanism for the system to follow up with users after a certain period of inactivity or as per the guidance received from scripted instructions.

105. The AI-based system of aspect 1, wherein the GM can be instructed to follow strict data privacy regulations during all interactions, ensuring user data confidentiality.

106. The AI-based system of aspect 1, wherein the GM can be instructed to provide medication reminders, appointment reminders, and other health-related prompts based on user-specific data.

107. The AI-based system of aspect 1, wherein the GM's responses adhere to different regional guidelines and cultural contexts based on the user's location.

108. The AI-based system of aspect 1, wherein the system facilitates digital health literacy by providing health education and resources to the user as per the guidance received from scripted instructions.

109. The AI-based system of aspect 1, wherein the GM can transition from one module to another based on its assessment of the user's current needs and conditions.

110. The AI-based system of aspect 1, wherein the GM can be instructed to interact with multiple users simultaneously while maintaining personalization and context for each user.

111. The AI-based system of aspect 1, wherein the GM uses real-time analytics to provide insights to healthcare providers about the user's health condition and needs.

112. The AI-based system of aspect 1, wherein the GM facilitates communication between the user and healthcare professionals as per the guidance received from scripted instructions.

113. The AI-based system of aspect 1, wherein the GM provides support and assistance for managing a variety of physical health conditions based on the user's health data and the guidance received from scripted instructions.

114. The AI-based system of aspect 1, wherein the GM can be instructed to facilitate support groups or community interactions as per the guidance received from scripted instructions.

115. The AI-based system of aspect 1, wherein the GM can be instructed to offer motivation, encouragement, and positive reinforcement as part of its interactions.

116. The AI-based system of aspect 1, wherein the GM can be instructed to integrate with IoT devices to gather more comprehensive data for personalized user interaction.

117. The AI-based system of aspect 1, wherein the GM can be instructed to provide interventions for lifestyle modifications or behavior changes as per the guidance received from scripted instructions.

118. The AI-based system of aspect 1, wherein the GM provides real-time updates to the scripted instructions based on its interaction with the user.

119. The AI-based system of aspect 1, wherein the GM can be instructed to adopt a variety of personas to better engage with different user demographics or to better fulfill specific tasks.

120. The AI-based system of aspect 1, wherein the GM can be instructed to assist in scheduling appointments, connecting with healthcare providers, and facilitating healthcare navigation as per the guidance received from scripted instructions.

Although the present disclosure has been explained in relation to its preferred embodiment, it is to be understood that many other possible modifications and variations can be made without departing from the spirit and scope of the disclosure.

The following is claimed:

1. A method for facilitating customizable communications with users, the method comprising:

receiving, using a communication device, at least one input associated with at least one user from at least one user device associated with the at least one user;

analyzing, using a processing device, the at least one input;

identifying, using the processing device, at least one instruction from a plurality of instructions based on the analyzing of the at least one input;

obtaining, using the processing device, at least one output using at least one language model based on the at least one input and the at least one instruction, wherein the at least one language model comprises a generative artificial intelligence model, wherein the at least one input comprises at least one query associated with the at least one user, and at least one characteristic corresponding to at least one of a capability and a limitation of the at least one user device, wherein the obtaining of the at least one output comprises:

determining at least one value to at least one parameter associated with the at least one language model based on the at least one instruction, wherein the at least one parameter governs a behavior of the at least one language model; and inputting the at least one input to the at least one language model based on the determining, wherein the at least one language model is configured for generating the at least one output based on the at least one value of the at least one parameter and the at least one input, wherein the at least one language model is further configured for tailoring the at least one output based on the at least one characteristic;

analyzing, using the processing device, the at least one output based on at least one criterion;

determining, using the processing device, an appropriacy of the at least one output for the at least one user based on the analyzing of the at least one output, wherein the appropriacy comprises a positive appropriacy and a negative appropriacy;

transmitting, using the communication device, the at least one output to the at least one user device, wherein the transmitting of the at least one output is based on the positive appropriacy of the at least one output; and storing, using a storage device, the at least one input and the at least one output.

2. The method of claim 1, wherein the analyzing of the at least one input comprises analyzing the at least one input using at least one machine learning model, wherein the at least one machine model is configured for classifying at least one of a state and an intent for the at least one user based on the at least one input, wherein the identifying of the at least one instruction is further based on at least one of the state and the intent.

3. The method of claim 1, wherein the analyzing of the at least one input comprises analyzing the at least one input using at least one machine learning model, wherein the at least one machine learning model is configured for predicting at least one requirement of the at least one user, wherein the identifying of the at least one instruction is further based on the at least one requirement.

4. The method of claim 1 further comprising:

obtaining, using the processing device, at least one previous input of the at least one user;

analyzing, using the processing device, the at least one previous input; and determining, using the processing device, at least one value for at least one variable based on the analyzing of the at least one previous input and the analyzing of the at least one input, wherein the identifying of the at least one instruction is further based on the at least one value of the at least one variable.

5. The method of claim 1 further comprising:

detecting, using at least one sensor, at least one of a physical state, a physiological state, and an emotional state of the at least one user;

generating, using the processing device, at least one user data associated with the at least one user, wherein the at least one user data comprises at least one sensor data and at least one external data, wherein the at least one sensor data is generated by the at least one sensor based on the detecting of at least one of the physical state, the physiological state, and the emotional state of the at least one user, wherein the at least one external data is generated by at least one external device, wherein the at least one external device comprises a wearable health device; and analyzing, using the processing device, the at least one user data, wherein the identifying of the at least one instruction is further based on the analyzing of the at least one user data, wherein the at least one sensor data and the at least one external data form an integrated data, wherein the integrated data is used for dynamically adjusting the at least one output of the at least one language model.

6. The method of claim 1 further comprising:

identifying, using the processing device, at least one first instruction from the plurality of instructions based on the negative appropriacy;

obtaining, using the processing device, at least one modified output using the at least one language model based on the at least one input and the at least one first instruction; and transmitting, using the communication device, the at least one modified output to the at least one user device.

7. The method of claim 1 further comprising:

receiving, using the communication device, at least one feedback for at least one previous output corresponding to at least one previous input from the at least one user device;

updating, using the processing device, at least one of a plurality of previous instructions based on the at least one feedback; and determining, using the processing device, at least one of the plurality of instructions based on the updating, wherein the identifying of the at least one instruction from the plurality of instructions is further based on the determining of at least one of the plurality of instructions.

8. The method of claim 7 further comprising obtaining, using the processing device, at least one additional information associated with at least one of the plurality of previous instructions, wherein the updating of at least one of the plurality of instructions is further based on the at least one additional information.

9. The method of claim 1 further comprising:

analyzing, using the processing device, the at least one instruction; and identifying, using the processing device, at least one portion of at least one data based on the analyzing of the at least one instruction, wherein the at least one language model is further configured for accessing the at least one portion of the at least one data based on the identifying, wherein the generating of the at least one output is further based on the accessing of the at least one portion of the at least one data.

10. A system for facilitating customizable communications with users, the system comprising:

a communication device configured for:

receiving at least one input associated with at least one user from at least one user device associated with the at least one user; and transmitting at least one output to the at least one user device, wherein the transmitting of the at least one output is based on a positive appropriacy of the at least one output;

a processing device communicatively coupled with the communication device, wherein the processing device is configured for:

analyzing the at least one input;

identifying at least one instruction from a plurality of instructions based on the analyzing of the at least one input;

obtaining the at least one output using at least one language model based on the at least one input and the at least one instruction, wherein the at least one language model comprises a generative artificial intelligence model, wherein the at least one input comprises at least one query associated with the at least one user, and at least one characteristic corresponding to at least one of a capability and a limitation of the at least one user device, wherein the obtaining of the at least one output comprises:

determining at least one value to at least one parameter associated with the at least one language model based on the at least one instruction, wherein the at least one parameter governs a behavior of the at least one language model; and inputting the at least one input to the at least one language model based on the determining, wherein the at least one language model is configured for generating the at least one output based on the at least one value of the at least one parameter and the at least one input, wherein the at least one language model is further configured for tailoring the at least one output based on the at least one characteristic;

analyzing the at least one output based on at least one criterion; and determining an appropriacy of the at least one output for the at least one user based on the analyzing of the at least one output, wherein the appropriacy comprises the positive appropriacy and a negative appropriacy; and a storage device communicatively coupled with the processing device, wherein the storage device is configured for storing the at least one input and the at least one output.

11. The system of claim 10, wherein the analyzing of the at least one input comprises analyzing the at least one input using at least one machine learning model, wherein the at least one machine model is configured for classifying at least one of a state and an intent for the at least one user based on the at least one input, wherein the identifying of the at least one instruction is further based on at least one of the state and the intent.

12. The system of claim 10, wherein the analyzing of the at least one input comprises analyzing the at least one input using at least one machine learning model, wherein the at least one machine learning model is configured for predicting at least one requirement of the at least one user, wherein the identifying of the at least one instruction is further based on the at least one requirement.

13. The system of claim 10, wherein the processing device is further configured for:

obtaining at least one previous input of the at least one user;

analyzing the at least one previous input; and determining at least one value for at least one variable based on the analyzing of the at least one previous input and the analyzing of the at least one input, wherein the identifying of the at least one instruction is further based on the at least one value of the at least one variable.

14. The system of claim 10 further comprising at least one sensor communicatively coupled with the processing device, wherein the at least one sensor is configured for detecting at least one of a physical state, a physiological state, and an emotional state of the at least one user, wherein the processing device is further configured for:

generating at least one user data associated with the at least one user, wherein the at least one user data comprises at least one sensor data and at least one external data, wherein the at least one sensor data is generated by the at least one sensor based on the detecting of at least one of the physical state, the physiological state, and the emotional state of the at least one user, wherein the at least one external data is generated by at least one external device, wherein the at least one external device comprises a wearable health device; and analyzing the at least one user data, wherein the identifying of the at least one instruction is further based on the analyzing of the at least one user data, wherein the at least one sensor data and the at least one external data form an integrated data, wherein the integrated data is used for dynamically adjusting the at least one output of the at least one language model.

15. The system of claim 10, wherein the processing device is further configured for:

identifying at least one first instruction from the plurality of instructions based on the negative appropriacy; and obtaining at least one modified output using the at least one language model based on the at least one input and the at least one first instruction, wherein the communication device is further configured for transmitting the at least one modified output to the at least one user device.

16. The system of claim 10, wherein the communication device is further configured for receiving at least one feedback for at least one previous output corresponding to at least one previous input from the at least one user device, wherein the processing device is further configured for:

updating at least one of a plurality of previous instructions based on the at least one feedback; and determining at least one of the plurality of instructions based on the updating, wherein the identifying of the at least one instruction from the plurality of instructions is further based on the determining of at least one of the plurality of instructions.

17. The system of claim 16, wherein the processing device is further configured for obtaining at least one additional information associated with at least one of the plurality of previous instructions, wherein the updating of at least one of the plurality of instructions is further based on the at least one additional information.

18. The system of claim 10, wherein the processing device further configured for:

analyzing the at least one instruction; and identifying at least one portion of at least one data based on the analyzing of the at least one instruction, wherein the at least one language model is further configured for accessing the at least one portion of the at least one data based on the identifying, wherein the generating of the at least one output is further based on the accessing of the at least one portion of the at least one data.

* * * * *